US007660829B2

(12) United States Patent
Steere et al.

(10) Patent No.: US 7,660,829 B2
(45) Date of Patent: Feb. 9, 2010

(54) SYSTEM AND METHOD FOR DELEGATING FILE SYSTEM OPERATIONS

(75) Inventors: David Cappers Steere, Bellevue, WA (US); Rohan Kumar, Redmond, WA (US); Yun Lin, Kirkland, WA (US); Danilo D'Amico Almeida, Woodinville, WA (US); Shishir Purushottam Pardikar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 10/448,532

(22) Filed: May 30, 2003

(65) Prior Publication Data

US 2004/0243644 A1    Dec. 2, 2004

(51) Int. Cl.
*G07F 17/30* (2006.01)
(52) U.S. Cl. .................. 707/200; 707/1; 707/205
(58) Field of Classification Search ............ 707/1, 707/200, 205
See application file for complete search history.

(56) References Cited

U.S. PATENT DOCUMENTS

| | | | | |
|---|---|---|---|---|
| 5,151,988 | A | * | 9/1992 | Yamagishi ................. 707/8 |
| 5,327,556 | A | * | 7/1994 | Mohan et al. ............... 707/8 |
| 5,551,046 | A | * | 8/1996 | Mohan et al. ............... 707/8 |
| 7,120,631 | B1 | * | 10/2006 | Vahalia et al. ............... 707/8 |
| 2002/0184216 | A1 | * | 12/2002 | Chandrasekaran et al. .... 707/8 |
| 2005/0216461 | A1 | * | 9/2005 | Williams et al. .............. 707/8 |

OTHER PUBLICATIONS

Randal C. Burns, et al., "Semi-Preemptible Locks for a Distributed File System," IEEE International Performance Computing & Communication Conference, 2000 (pp. 397-404).*
Amiri et al, "Highly Concurrent Shared Storage," Proceedings of the International Conference on Distributed Computing System, Taipei, Apr. 2000.*
Trancoso et al., "The Impact of Speeding Up Critical Sections with Data Prefetching and Forwarding," 1996 International Conference on Parallel Processing, pp. 111-79-111-86, 1996, IEEE.*
Cary G. Gray et al., "Leases: An Efficient Fault-Tolerant Mechanism for Distributed File Cache Consistency," *Association for Computing Machinery*, 1989 (pp. 202-210).
Randal C. Burns, et al., "Semi-Preemptible Locks for a Distributed File System," *IEEE International Performance Computing & Communication Conference*, 2000 (pp. 397-404).
Michael L. Kazar et al., "DEcorum File System Architectural Overview," Usenix.org, Summer 1990 (pp. 151-167).

* cited by examiner

*Primary Examiner*—Neveen Abel Jalil
*Assistant Examiner*—Farhan M Syed
(74) *Attorney, Agent, or Firm*—Merchant & Gould, P.C.

(57) ABSTRACT

The invention provides a distributed file system configured to delegate file system operations to clients. The client obtains a delegation associated with an object managed by the server. The delegation enables the client to perform a file system operation on behalf of the server. The client caches the object and enables users associated with the client to access the object in accordance with the delegation.

53 Claims, 20 Drawing Sheets

SYSTEM AND METHOD FOR DELEGATING FILE SYSTEM OPERATIONS

BACKGROUND OF THE INVENTION

In many of today's distributed client/server environments, client computers are frequently equipped with significant processing power and persistent storage. Yet, if a distributed file system is used, the client computers often sit idle while file servers tend to be heavily loaded. This is because conventional distributed file systems require file servers to maintain substantial control over their files. In such a file system, a client that requests access to a particular file is typically required to maintain an active communication link to constantly interact with the file server. In particular, a file handle is extended from the file server to the client. An interruption in the communication link would result in an error. In such an environment, most of the work associated with file handling rest on the file server.

To streamline file system operations, some current distributed file systems allow clients to cache files that are centrally maintained in a file server. In these file systems, when a client caches a file, a copy of the file is saved in the client's memory while the original file in the file server is locked. Locking the original file is necessary to ensure that two or more users do not attempt to modify the same file simultaneously. Although, a distributed file system that enables client file caching provides a somewhat more capable file-sharing environment, the system still requires a significant amount of communication overhead and places extensive restrictions on simultaneous file sharing by multiple users.

An effective and efficient method for sharing files among multiple users eludes those skilled in the art.

SUMMARY OF THE INVENTION

Briefly stated, the present invention is directed to a distributed file system configured to delegate file system operations to clients. In one aspect, the invention is directed to a computer-implemented method for a client to interact with a server. The client obtains a delegation associated with an object managed by the server. Possession of the delegation enables the client to perform certain operations on an object without further contact with the server. The client caches the object and enables users associated with the client to access the object in accordance with the delegation, without the overhead of server communication.

In another aspect, the invention is directed to a computer-implemented method for a client to handle a request associated with an object that is managed by a server. The client processes the request using a delegation associated with the object. The delegation enables the client to perform a file system operation on the object on behalf of the server. The client performs a file system operation associated with the request in accordance with the delegation.

In yet another aspect, the invention is directed to a computer-implemented method for a client to handle a shared object that is managed by a server. The client receives a request to access the shared object and acquires a delegation associated with the shared object. The delegation enables the client to perform a file system operation on the shared object on behalf of the server. The client performs the file system operation on the object without additional communications with the server.

In still another aspect, the invention is directed to a computer-implemented method for a server to share an object managed by the server with clients. The computer-implemented method includes receiving a request for accessing the object from a client and issuing a delegation to the client.

In still yet another aspect, the invention is directed to a method for communicating between clients and servers in a distributed file system. The client issues a request for a delegation associated with an object managed by the server. The server receives the request for the delegation and determines states associated with the delegation. The server issues the delegation having the determined states. The client receives the delegation and performs a file system operation on the object in accordance with the delegation.

In a further aspect, the invention is directed to a computer-implemented method for coordinating between a client and a server in a distributed environment. The client determines client delegation records and the server determines server delegation records. A determination is made if the client delegation records and the server delegation records match. If the client delegation records and the server delegation records do not match, the client delegation records and the server delegation records are synchronized.

In still a further aspect, the invention is directed to a distributed file system for sharing an object. The distributed file system includes a client and a file server. The client is configured to obtain a delegation associated with the object. The file server is configured to manage the object and to issue the delegation associated with the object.

In still yet a further aspect, the invention is directed to a computer-readable medium encoded with a data structure. The data structure includes a first, second, and third data fields. The first data field contains delegations associated with shared objects managed by a server. The second data field contains states where each of the states is associated with a delegation in the first data field. The third data filed contains cached objects derived from the shared objects.

DETAILED DESCRIPTION OF THE PREFERRED EMBODIMENT

The inventors of the present invention have determined that in a distributed file system, enabling clients to perform certain file system operations while still maintaining the same semantics as if all operations were sent to a file server would significantly improve file-sharing performance. The inventors have also appreciated that the client-performed file system operations can be configured in such a way that would reduce server/client communications when an object is only cached by one client while still enabling other clients to share the object upon request. Thus, the present invention focuses on a system and method for delegating file system operations. The manner in which file system operations are delegated in accordance with the present invention is very different from conventional file-sharing methods. For example, a conventional method may employ time-limited leases to enable clients to cache files. During the term of a lease, the client caches a file locally while the file in the server is locked. Thus, although the use of a lease for sharing a file may enable a client to cache the file, efficient caching is only possible during the term of the lease, which may only last for seconds. Also, sharing a file using a lease still requires the client to update the file on the server when the lease expires and applies only for file content caching. Furthermore, sharing cannot occur during the term of the lease because the client with the lease continues to hold the file for the duration of the lease.

In contrast, the present invention enables clients to acquire delegations from a file server to perform file system operations on behalf of the file server. Each delegation is associated with an object on a file server and includes states that are configured to have varying privileges and scope. The different delegation states enable multiple clients to access the same file simultaneously without causing an error or generating unnecessary communications and system resource overhead. For example, if a first client obtained a delegation for a particular object and a second client subsequently submitted a request associated with the object that would conflict with the delegation, the first client may flow a state back to the server to resolve the sharing violation. These and other aspects of the invention will become apparent after reading the following detailed description.

Figure 1:
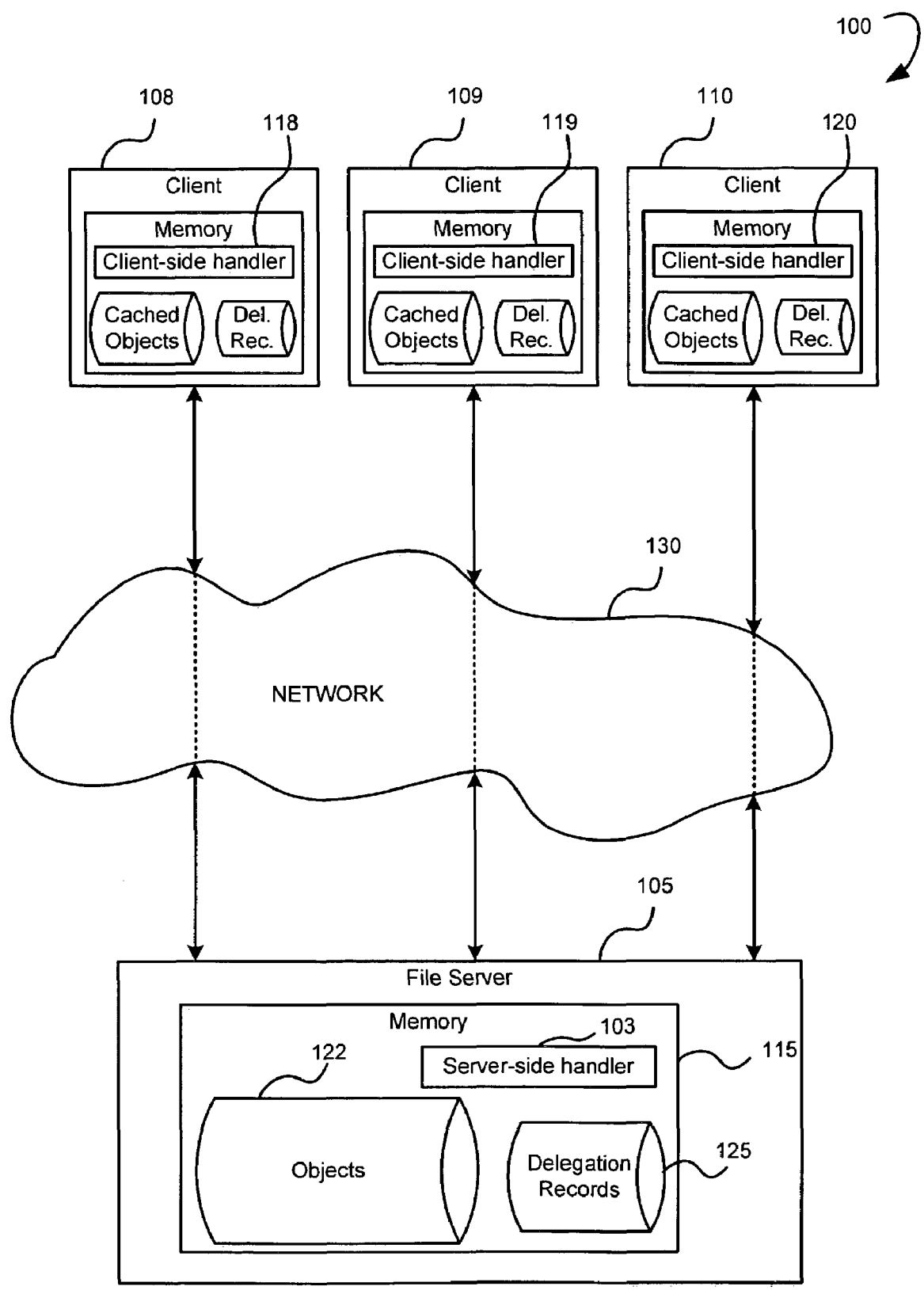
FIG. 1 is a schematic diagram of an exemplary configuration of a delegation capable file-sharing system that implements the present invention.

FIG. 1 is a schematic diagram of an exemplary configuration of a delegation capable file-sharing system 100 that implements the present invention, according to one embodiment of the invention. In other configurations, delegation capable file-sharing system 100 may include many more components than those shown. As shown in the figure, delegation capable file-sharing system 100 includes file server 105 and clients 108-110.

File server 105 is a computing device that is configured to manage objects and facilitate sharing of the objects for clients 108-110. File server 105 may include one or more computers. Each computer is typically configured with a memory, which may include any type of data storage mechanism. For illustration purpose, file server 105 is shown to include memory 115. As shown in the figure, memory 115 includes a server-side handler 103, objects 122 and delegation records 125. Server-side handler 103 is a software component of file server 105 and is configured to handle sharing of objects for file server 105. Server-side handler 103 may be integrated as part of the file system of file server 105 or may be implemented as a separate component such as a filter. Server-side handler 103 is configured to coordinate with client-side handlers 118-120 to facilitate sharing of objects 122. In particular, server-side handler 103 enables file server 105 to delegate file system operations to clients 108-110. Objects 122 are data structures stored in file server 105 that may be shared by clients 108-110. Objects 122 may be any type of data structures, such as file directories, any kind of files such as executables, data, streams, etc.

File server 105, which is configured with server-side handler 103, is much more capable then conventional file servers. In addition to being configured to directly perform typical file system operations, file server 105 is also configured to delegate those file system operations to clients 108-110. Memory 115 of file server 105 includes delegation records 125. Delegation records 125 contain information about delegations. A delegation is a set of rights given by a file server to a client for performing file system operations associated with an object on behalf of file server 105. Each delegation may include multiple states. Each state specifies the level of a right associated with performing a particular file system operation.

In one embodiment, a delegation includes an open access delegation state, an open deny delegation state, a data delegation state, and an attribute delegation state. The two open delegation states specify the right to open an object. The open access delegation state specifies open access rights for the client with the delegation. The open deny delegation states specify open access rights for other sharing clients. Both open delegation states may include any combination of read, write, and delete. The data delegation state specifies the right associated with the data of an object. The data delegation state may include no delegation, read, or read/write. The attribute delegation state specifies the right associated with the attributes of an object. The attribute delegation state may be further divided into a stream attribute delegation state and a file attribute delegation state. Stream attributes may include stream size, compression, encryption, sparseness, etc. File attributes may include hidden, file times, read-only, etc. For simplicity of discussion, only one attribute delegation state will be discussed. The attribute delegation state may include no delegation, read, or read/write. A delegation in accordance with this embodiment may be summarized in Table 1. It is to be appreciated that other delegation states may be included in other embodiments of the invention. Some other exemplary delegation states are byte range locking, data delegation states on specific byte ranges of a file, on specific attributes, etc.

TABLE 1

Summary of delegation states.

| Delegation state | No del. (Ø) | Read (r) | Write (w) | Delete (d) |
|---|---|---|---|---|
| Open access | | √ | √ | √ |
| Open deny | | √ | √ | √ |
| Data | √ | √ | √ | |
| Attribute | √ | √ | √ | |

The states of a delegation may be represented by shorthand notations. For example, open access delegation state may be represented by O(x,_) where x is the delegation state level. Similarly, open deny delegation state, data delegation state and attribute delegation state may be represented by O(_,~x), D(x) and A(x), respectively. The shorthand notations are summarized in Table 2.

TABLE 2

Summary of delegation states shorthand notation.

| Delegation state | Notation |
|---|---|
| Open access | O(x, _) |
| Open deny | O(_, ~x) |
| Data | D(x) |
| Attribute | A(x) |

Thus, a delegation that allows a client full and exclusive access to an object would be: O(rwd,~rwd), D(w), and A(w). The client with this delegation would be able to read, write, and delete the object; read and write data associated with the object; and read and write the attribute associated with the object. However, no other client can read, write or delete the object.

File server 105 is also configured to communicate with clients 108-110 through network 130, which may be any type of network such as the Internet or any wide area network (WAN), local area network (LAN), wireless network, etc. Communications between file server 105 and clients 108-110 will be discussed in detail in conjunction with FIGS. 2 and 3. Briefly stated, file server 105 is configured to communicate with clients 108-110 for sharing objects 122, granting delegations to the clients, coordinating the delegations, and resolving object-sharing conflicts among the clients. Communications between clients and server are considered computer-readable media.

Clients 108-110 are computing devices that are configured to access objects from file server 105. Clients 108-110 may be configured to enable users to work directly on them or to serve as a server for other computing devices. Each of the clients 108-110 is configured with a memory, which may include any type of data storage mechanism. Memories of the clients and server are considered computer-readable media.

As shown in the figure, the memory of each client includes cache objects and delegation records. A cached object may include a copy of one of the objects 122 stored in file server 105 and is cached by a client using a delegation associated with the cached object. It is to be appreciated that each of the clients 108-110 may be configured to cache objects servers other than file server 105. The client may perform file system operations on cached objects in accordance with the delegations associated with those cached objects.

The delegation records stored in a client's memory include information about the delegations that the client obtained from each server. Ideally, a client's delegation records are identical to the corresponding set of file server's delegation records 125. However, when the two sets of delegation records may diverge in state because of a communication disconnect between the client and the file server. A synchronization process may be used when the connection is reestablished.

Figure 2:
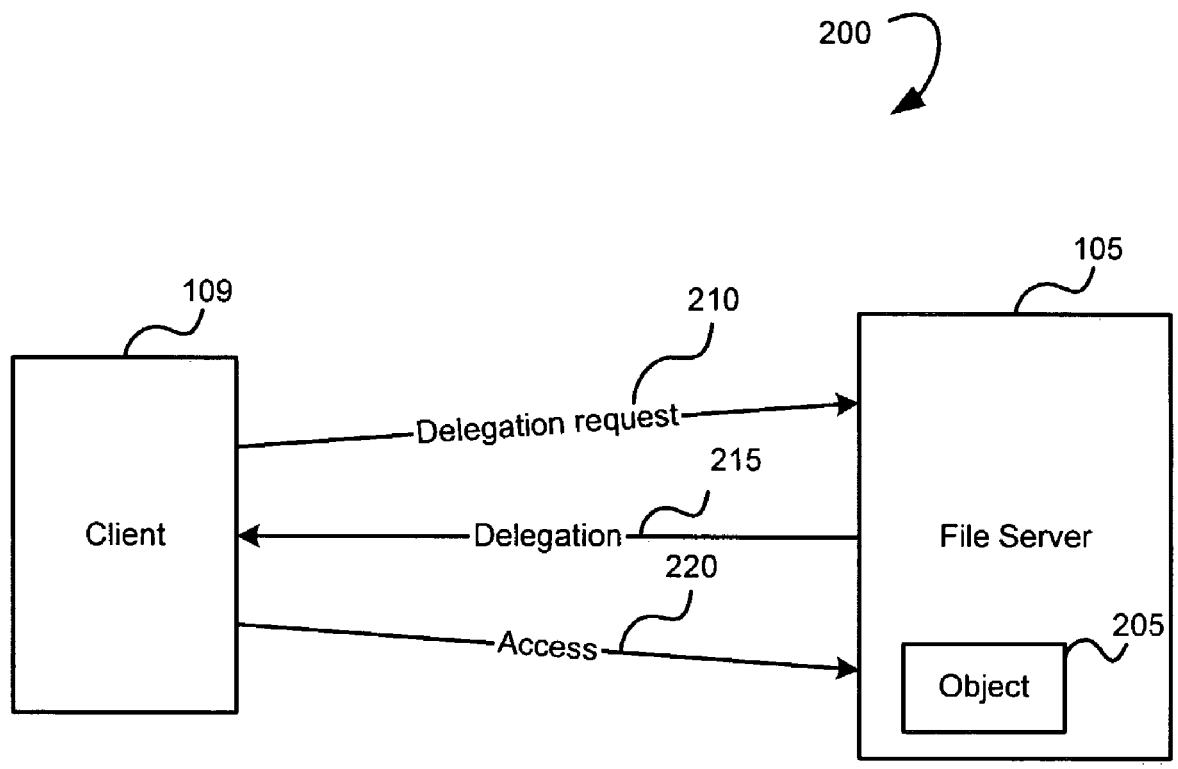
FIG. 2 is a schematic diagram of exemplary communications between a file server and a client in a delegation capable file-sharing system.

FIG. 2 is a schematic diagram of exemplary communications 200 between a file server and a client in a delegation capable file-sharing system, in accordance with one embodiment of the invention. For illustrative purpose, the communications are shown to be between file server 105 and client 109. However, in operation, the communications are actually between software components of a file server and a client, such as between server-side handler 115 and client-side handlers 118-120.

As shown in the figure, object 205 is stored in file server 105. In this example, client 109 is instructed to obtain access for object 205. Client 109 may obtain access to object 205 using conventional method, which involves obtaining a file handle from file server 105 for object 205. However, in accordance with the present invention, client 109 may be configured to obtain a delegation from file server 105 by sending a message containing a delegation request 210. Delegation request 210 is associated with object 205 and may include one or more delegation states, such as those discussed previously in conjunction with Table 1. For example, delegation request 210 may include a request for a delegation of O(rwd,~rwd), D(w), and A(w), which would allow client 109 full and exclusive local access to object 205. It is to be appreciated that client 109 may be configured to ask for various levels of access depending on how the client is configured.

In response to delegation request 210, file server 105 may send a message containing issued delegation 215 to client 109. Issued delegation 215 may include one or more states related to file system operations. The states in issued delegation 215 may be identical to, more than or less than the levels specified in delegation request 210. File server 105 may determine what levels of the delegation states to grant to client 109 based on policies, timing, conflicts, availability, resources, and any other operational parameters. The message containing issued delegation 215 may also include other information such as information related to accessing object 205, a delegation identification number (DIN) and delegation serial number (DSN), etc. DIN is an identifier that uniquely identifies issued delegation 215. DSN is a monotonically increasing identifier based on the number of delegations that file server 105 has issued. The DSN may be unique to a particular client or a group of clients. DIN and DSN are used by file server 105 and client 109 to manage delegations.

In response to issue delegation 215, client 109 may send access message 220 for accessing object 205. Client 109 may cache object 205 by copying the object to the client's memory. In accordance with the present invention, client 109 does not have to keep an open file handle on file server 105 to obtain access to object 205, thus reducing the amount of necessary communications. Also, depending on issued delegation 215, file server 105 may not need to communicate with client 109 to share object 205 with other clients.

Figure 3:
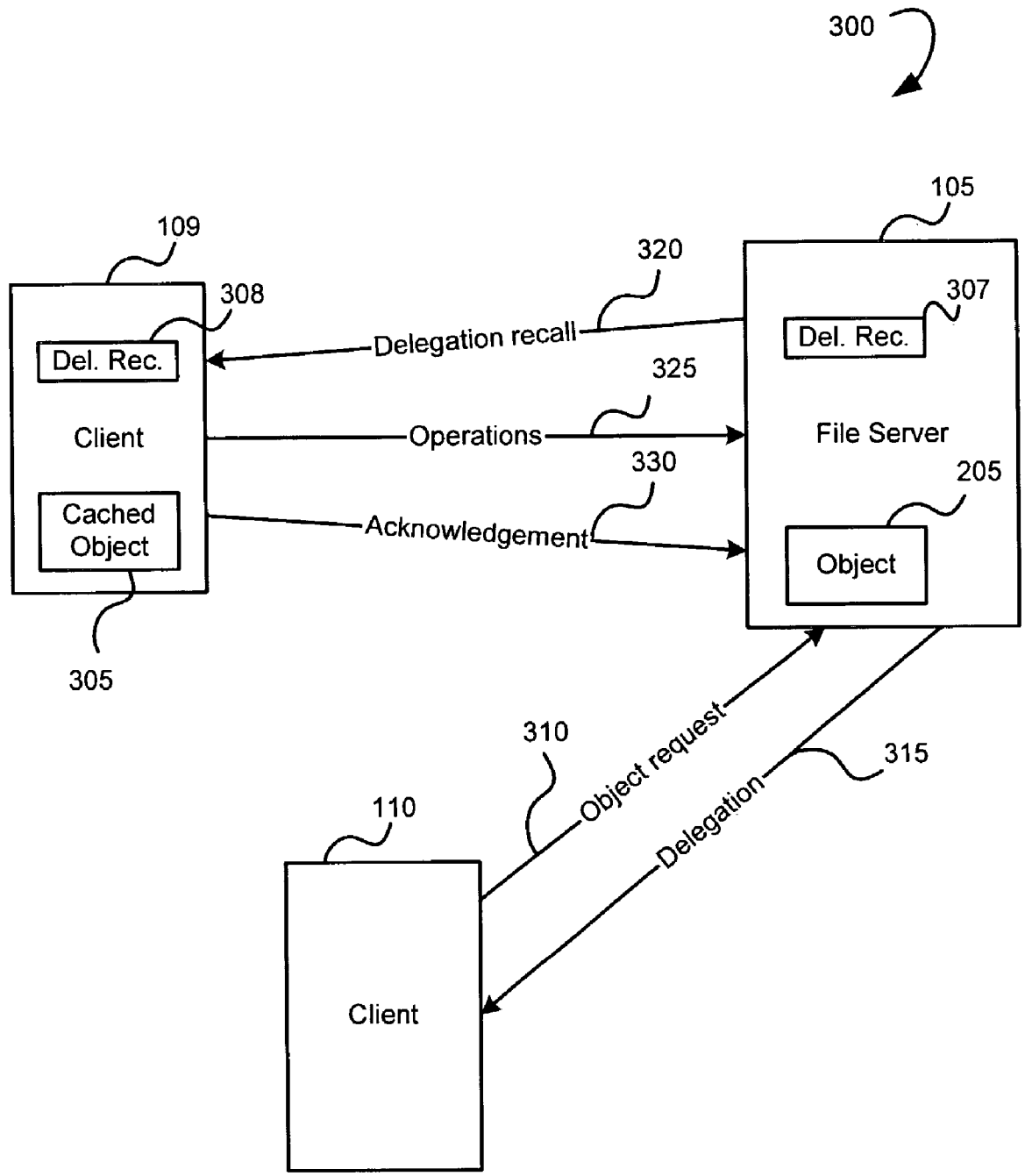
FIG. 3 is a schematic diagram of exemplary communications between a file server and a client in a delegation capable file-sharing system for recalling a delegation.

FIG. 3 is a schematic diagram of exemplary communications 300 between a file server and a client in a delegation capable file-sharing system for recalling a delegation, in accordance with one embodiment of the invention. As shown in the figure, cached object 305 is stored in client 109, which caches object 205 based on a delegation issued by file server 105. Client 109 and file server 105 also include delegation records 307-308, respectively. Delegation records 307-308 contain information about the delegation associated with object 205 and are ideally identical.

The exemplary communications begin when client 110 issues a message to file server 105 that includes object access request 310. Object access request 310 may include a conventional access request for object 205. Object access request 310 may also include a request for a delegation associated with object 205. In this example, object access request 310 conflicts with the delegation belonging to client 109. File server 105 determines to recall the delegation issued to client 109 so that file server 105 may partially or entirely satisfy the object access request 310. File server 105 sends a message to client 109 that includes delegation recall 320, which demands the original delegation be recalled to file server 105. Depending on object request 310, policy considerations, status of the object, and other operational parameters, file server 105 may completely recall the delegation. File server 105 may also downgrade the original delegation by offering another delegation with states at levels that would not conflict with object access request 310.

When client 109 receives the message with delegation recall 320, it determines whether there are operations that would be affected by the recall. If so, client 109 may close the affected operations 325 or may flow them back to file server 105. Flowing affected operations 325 to file server 105 may require more communications between client 109 and file server 105 than if the operations were performed by client 109. After processing delegation recall 320, client 109 sends a message to file server 105 with acknowledgement 330 to confirm that the delegation has been cancelled or changed.

In response to the acknowledge 330, file server 105 may grant object access request 310 sent by client 110. If object access request 310 includes a delegation request, file server 105 may send a message containing a delegation 315 to client 110.

Figure 4:
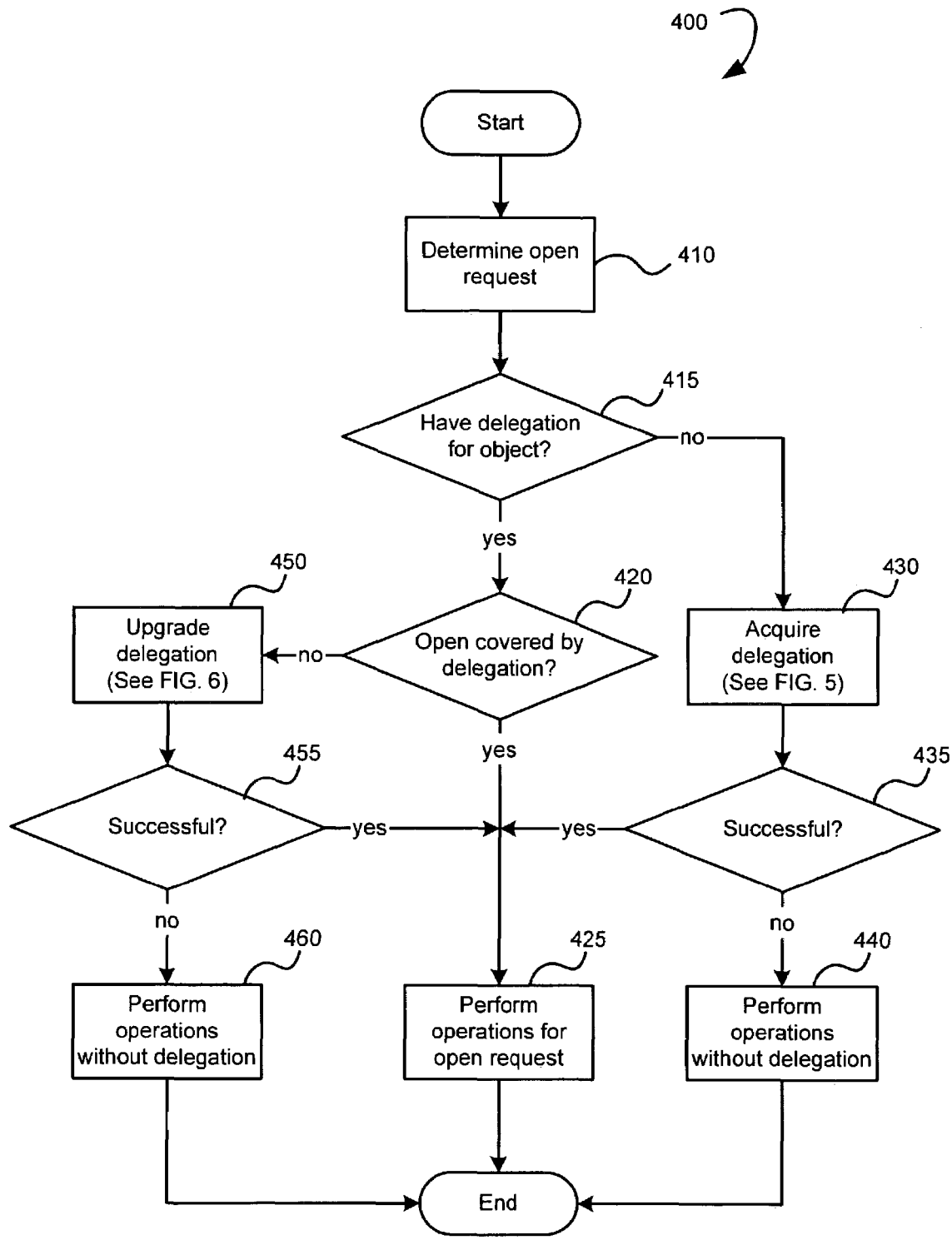
FIG. 4 is an operational flow diagram of an exemplary process for a client to process an object open request using delegation.

FIG. 4 is an operational flow diagram of an exemplary process 400 for a client to process an object open request using delegation, in accordance with one embodiment of the invention. Moving from a start block, process 400 begins at block 410 where an open request associated with an object is determined. The object is a shared object managed by a file server. If the client is a computer for use by users, the open request may be issued by a user who is logged onto the client. The open request may also be issued by other computers connected to the client.

Process 400 continues at decision block 415 where a determination is made whether the client has a delegation for the object. If the client does not have a delegation for the object, the process moves to block 430 where a delegation for the object is acquired. The process for acquiring a delegation will be discussed in detail in conjunction with FIG. 5. Briefly stated, the client will communicate with the file server to acquire a delegation with the appropriate delegation states to satisfy the object open request. The delegation would enable the client to perform file system operations associated with the object open request. Process 400 moves to decision block 435 where a determination is made whether the delegation is successfully acquired. If the delegation is not acquired successfully, the process moves to block 440 where the file system operations for the object open request is performed by the client without a delegation. The process then ends.

Returning to decision block 435, if the delegation is successfully acquired, process 400 continues at block 425 where the file system operations for the object open request is performed by the client. The process then ends.

Returning to decision block 415, if the client has a delegation for the object, process 400 continues at block 420 where a determination is made whether the object open request is covered by the delegation. If so, the file system operations for the object open request is performed by the client and the process ends.

Returning to decision block 420, if the delegation does not cover the object open request, process 400 continues at block 450 where the delegation is upgraded. The process for upgrading a delegation will be discussed in detail in conjunction with FIG. 6. Briefly stated, the client will communicate with the file server to upgrade a delegation with the appropriate delegation states to satisfy the object open request.

Process 400 continues at decision block 455 where a determination whether the delegation is successfully upgraded. If the delegation is not upgraded successfully, the process moves to block 460 where the file system operations for the object open request is performed by the client without a delegation. The process then ends. Returning to decision block 455, if the delegation is successfully upgraded, process 400 continues at block 425 where the file system operations for the object open request is performed by the client and the process ends.

Figure 5:
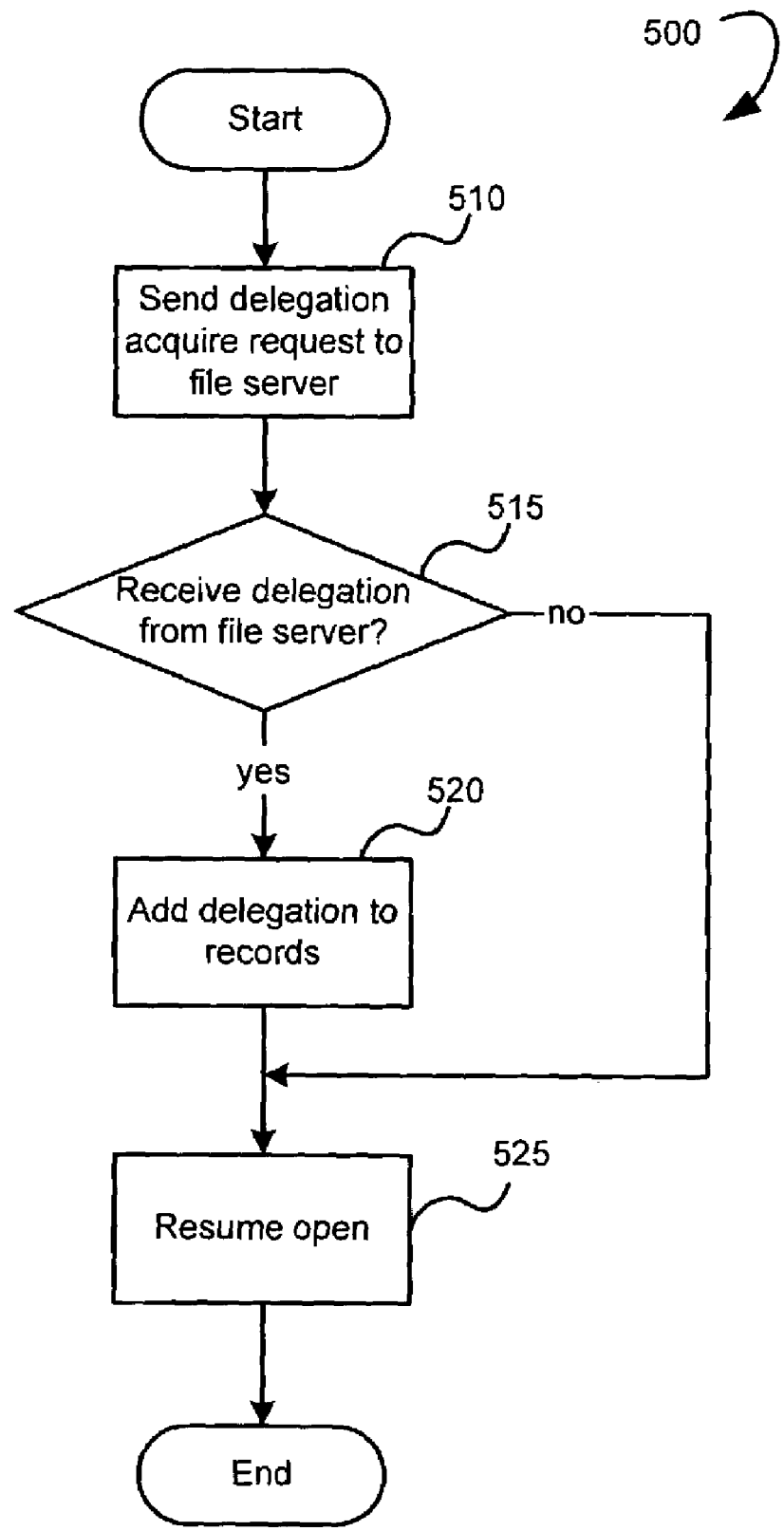
FIG. 5 is an operational flow diagram of an exemplary process for a client to obtain a delegation from a file server.

FIG. 5 is an operational flow diagram of an exemplary process 500 for a client to obtain a delegation from a file server, in accordance with one embodiment of the invention. Process 500 may be used when a client received a request to open an object. Moving from a start block, process 500 begins at block 510 where a delegation acquire request is sent to the file server. The delegation acquire request is designed to acquire a delegation associated with an object managed by the file server. The delegation acquire request may specify the states of delegation that are desired. The process continues at decision block 515.

At decision block 515, a determination is made whether a delegation is received from the file server. The determination may be made based on a variety of timing parameters. For example, the determination may be made after a message was received from the file server, after a pre-determined period of time has passed, etc. If a delegation has not been received from the file server, process 500 moves to block 525.

Returning to decision block 515, if a delegation is received from the file server, process 500 continues at block 520 where information about the received delegation is added to the client's delegation records. Process 500 moves to block 525 where file system operations associated with opening the object are resumed. If a delegation is available, the object can be opened using the delegation. If a delegation is not available, the object may be opened using a convention process without using a delegation. The process then ends.

Figure 6:
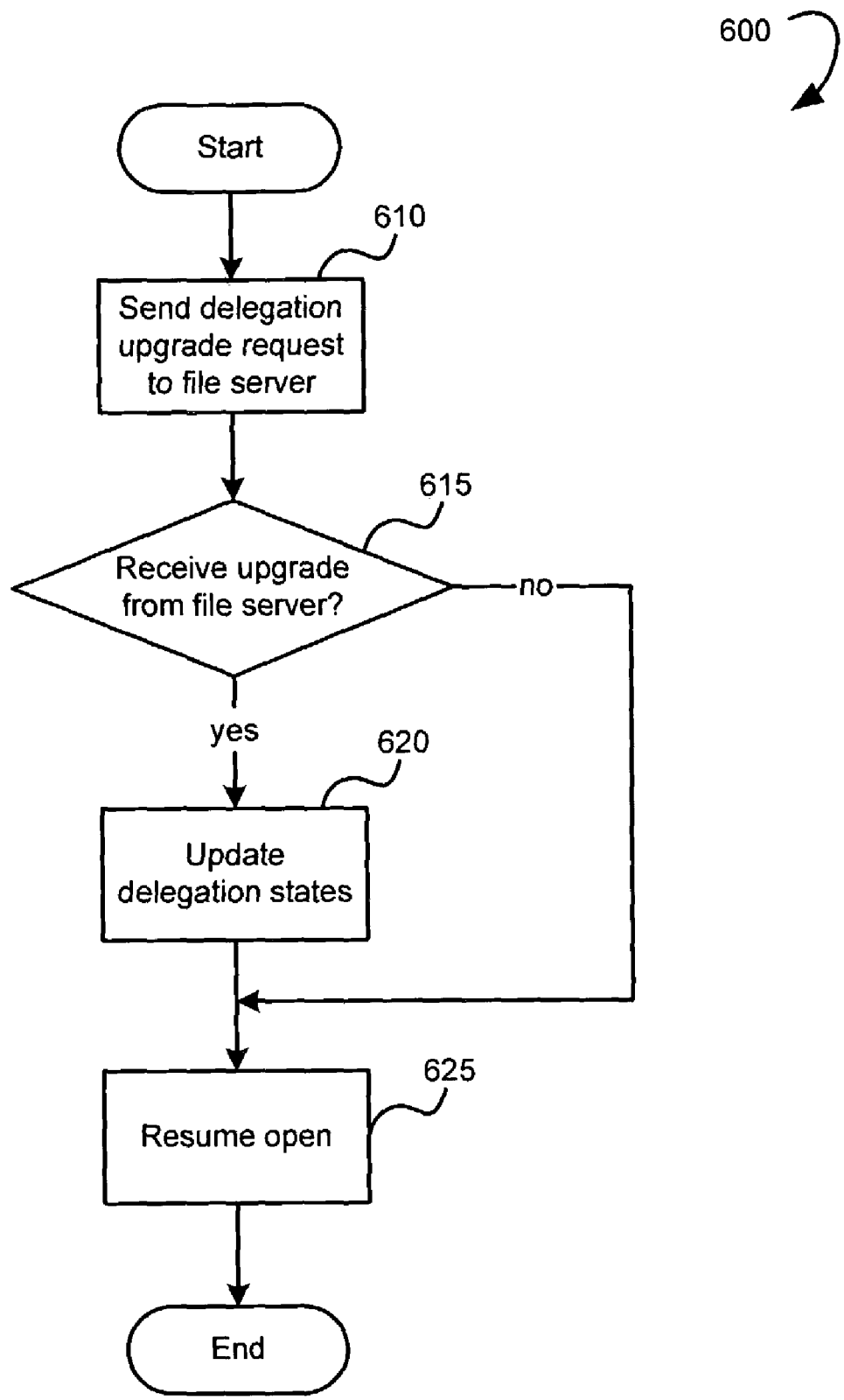
FIG. 6 is an operational flow diagram of an exemplary process for a client to upgrade a delegation.

FIG. 6 is an operational flow diagram of an exemplary process 600 for a client to upgrade a delegation, in accordance with one embodiment of the invention. Process 600 may be used when a client received a request to open an object but the delegation associated with the object includes states that are not at levels sufficient for performing the file system operations in connection with the open request. Moving from a start block, process 600 begins at block 610 where a delegation upgrade request is sent to the file server. The process continues at decision block 615 where a determination is made whether an upgrade is received from the file server. If no upgrade is received, process 600 continues at block 625.

Returning to decision block 615, if an upgrade is received from the file server, process 600 continues at block 620 where the delegation states associated with the upgraded delegation is updated. Process 600 moves to block 625 where file system operations associated with opening the object are resumed. If an upgraded delegation is available, the object can be opened using the upgraded delegation. If a delegation is not available, the object may be opened using a convention process without using a delegation or using the existing delegation if it is sufficient. The process then ends.

Figure 7:
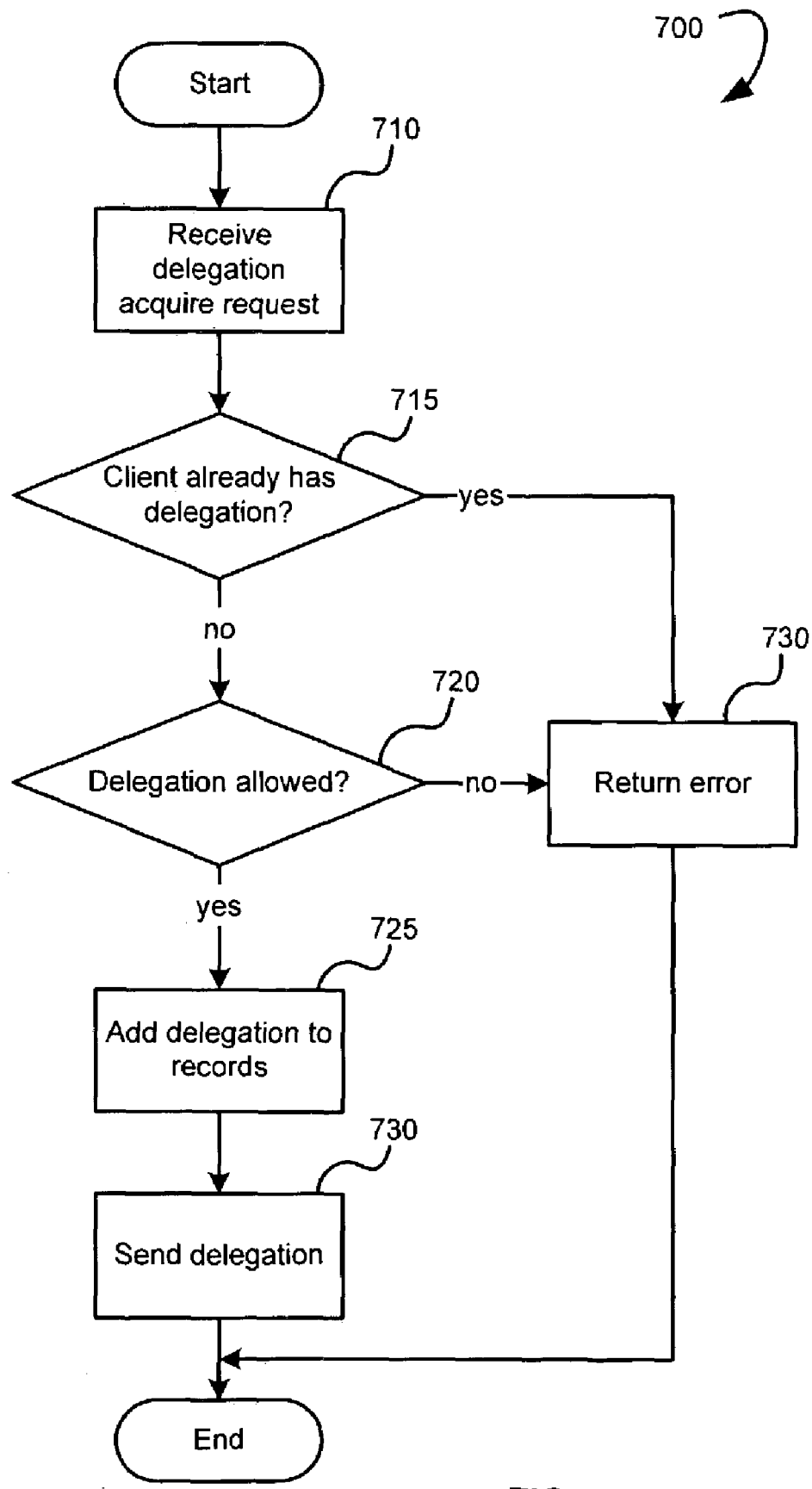
FIG. 7 is an operational flow diagram of an exemplary process for a file server to issue a delegation.

FIG. 7 is an operational flow diagram of an exemplary process 700 for a file server to issue a delegation, in accordance with one embodiment of the invention. Moving from a start block, process 700 begins at block 710 where a delegation acquire request is received from a client to acquire a delegation for an object managed by the file server. The process continues at decision block 715 where a determination is made whether the client already has a delegation for the object. If so, process 700 moves to block 730 where an error is returned and the process ends.

Returning to decision block 715, if the client does not have an existing delegation for the object, process 700 moves to decision block 720 where a determination is made whether giving a delegation for the object to the client is allowed. The file server may make the determination based on any operational parameters such as policies, timing, conflicts, availability, resources, access rights of clients, etc. Process 700 continues at block 725. If a delegation is not allowed, the process moves to block 730 where an error is returned and ends.

At block 725, information about the delegation is added to the delegation records stored in the file server. At block 730, the delegation is sent to the client. Process 700 then ends.

Figure 8:
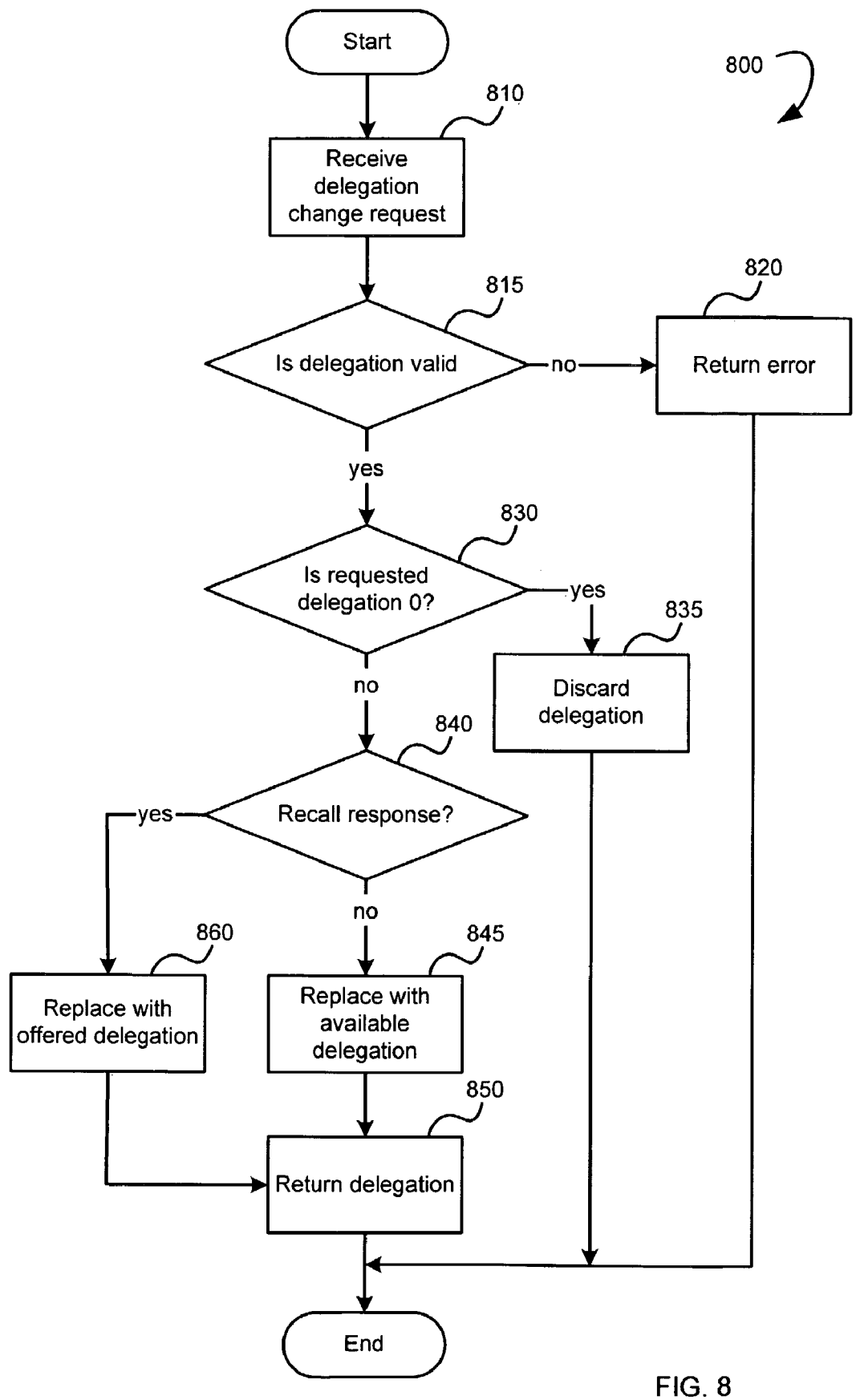
FIG. 8 is an operational flow diagram of an exemplary process for a file server to change an existing delegation.

FIG. 8 is an operational flow diagram of an exemplary process 800 for a file server to change an existing delegation, in accordance with one embodiment of the invention. A client may request the file server to change an existing delegation because of operational reasons on the client-side. The client may also request the file server to change an existing delegation due to a demand from the file server, such as a delegation recall. Moving from a start block, process 800 begins at block 810 where a delegation change request is received from the client. Process moves to decision block 815 where a determination is made whether the delegation is valid. If the delegation is not valid, process moves to block 820 where an error is returned and the process ends.

Returning to decision block 815, if the delegation is valid, process 800 continues at decision block 830 where a determination is made whether the states of the requested delegation levels are 0. A 0 delegation state means no access. If the states of the requested delegation levels are 0, process 800 continues at block 835 where the delegation is discarded. The server may also notify the client that the delegation has been discarded. The process then ends.

Returning to decision block 830, if the states of the requested delegation levels are not 0, process 800 continues at decision block 840 where a determination whether the delegation change request from the client was sent in response to a delegation recall. If so, the process moves to block 860 where the delegation is replaced with the delegation offered in the delegation recall previously issued by the file server. Process 800 continues at block 850 where the replaced delegation is returned to the client and the process ends.

Returning to decision block 840, if the delegation change request from the client was not sent in response to a delegation recall, process 800 continues at block 845 where the delegation is replaced with a new delegation having states that are available. The process moves to block 850 where the replaced delegation is returned to the client and the process ends.

Figure 9:
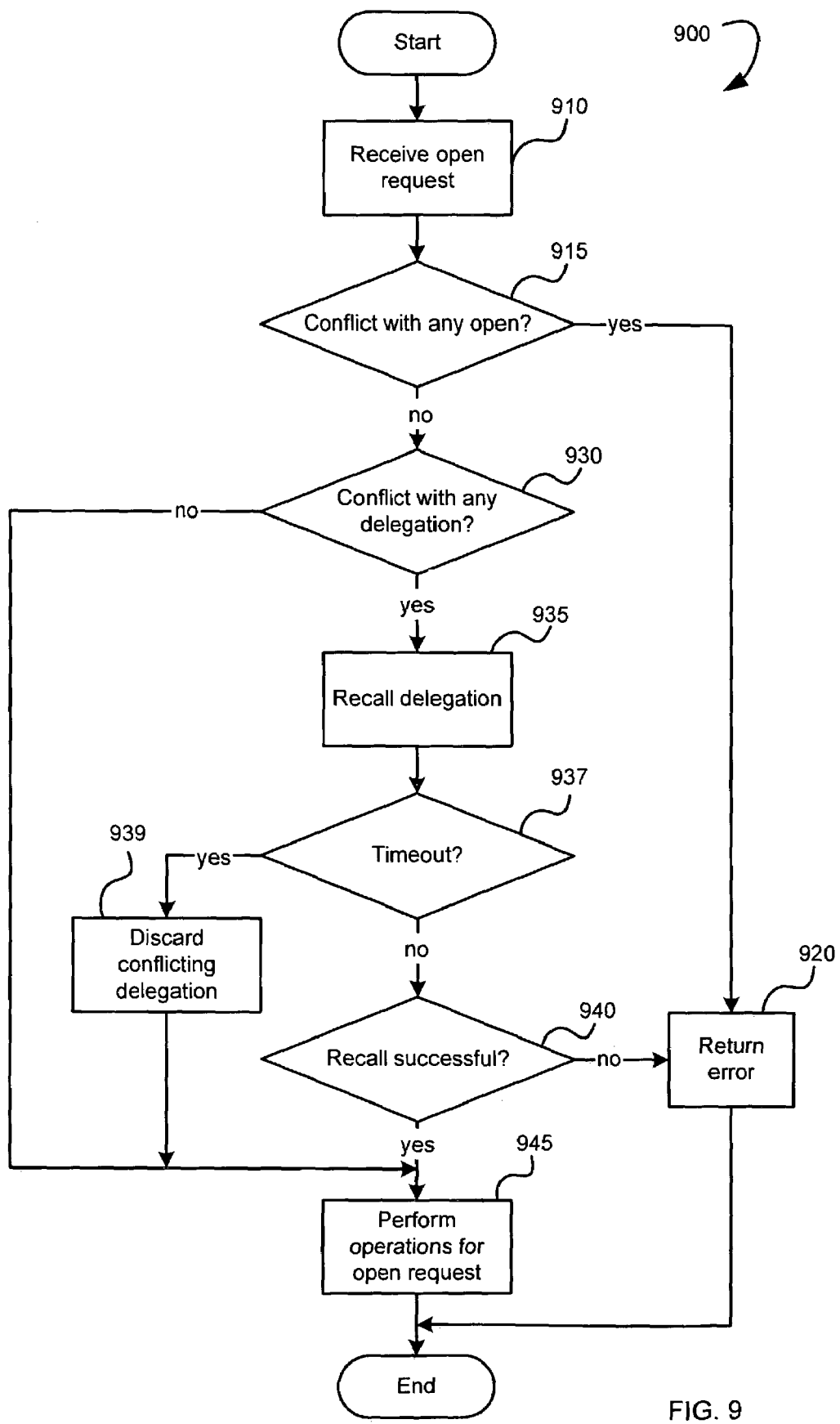
FIG. 9 is an operational flow diagram of an exemplary process 900 for a file server to handle an open request sent by a client.

FIG. 9 is an operational flow diagram of an exemplary process 900 for a file server to handle an open request sent by a client, in accordance with one embodiment of the invention. The open request is associated with accessing an object managed by the file server. Moving from a start block, process 900 begins at block 910 where an open request is received from a client. The process continues at decision block 915 where a determination is made whether the open request conflicts with any existing open associated with the object. For example, another client or a process on the file server may have a handle open for the object. If the open request conflicts with an existing open, process 900 moves to block 920 where an error is returned and the process ends.

Returning to decision block 915, if the open request does not conflict with any existing open, process 900 continues at decision block 930 where a determination is made whether the open request conflicts with an existing delegation associated with the object. In accordance with the present invention, the file server is configured to recognize an open request for an object that is issued by a client that has an existing delegation for the object. In this case, the open request would not conflict with the delegation. If the open request does not conflict with any delegation held by other clients, process 900 moves to block 945 where file system operations associated with the open request are performed and the process ends.

Returning to decision block 930, if the open request conflicts with a delegation held by another client, process 900 moves to block 935 where the delegation is recalled. The file server typically waits for an acknowledgement for the delegation recall from the other client. At decision block 937, a determination is made whether a timeout has occurred. A timeout occurs when the other client with the delegation does not respond to the file server's delegation recall. The other client may be disconnected from the file server and cannot respond to the delegation recall. To prevent an object from being indefinitely constrained by the delegation of a disconnected client, the file server will cancel the client's delegation after a pre-determined period of time. Thus, if a timeout has occurred, process 900 moves to block 939 where the conflicting delegation is discarded. The process then moves to block 945. If a timeout has not occurred, the process continues at decision block 940.

At decision block 940, a determination is made whether the recall was successful. The recall may fail for various reasons. For example, if the client has an outstanding exclusive open, the recall may fail. If the recall was not successful, process 900 continues at block 920 where an error is returned and ends. Returning to decision block 940, if the recall was successful, process 900 moves to block 945. At block 945, file system operations associated with the open request are performed and the process ends.

Figure 10:
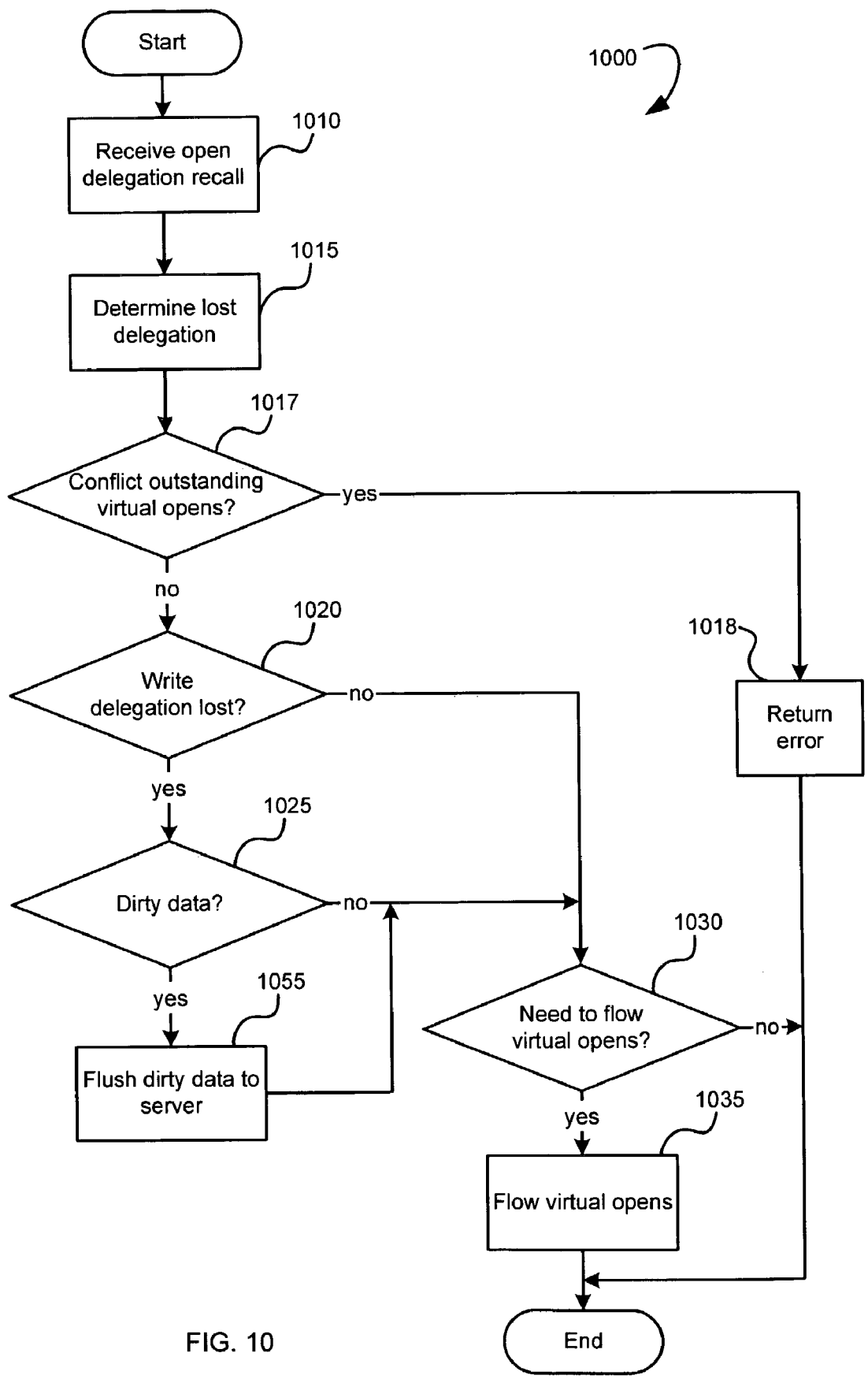
FIG. 10 is an operational flow diagram of an exemplary process for a client to handle an open delegation recall.

FIG. 10 is an operational flow diagram of an exemplary process 1000 for a client to handle an open delegation recall, in accordance with one embodiment of the invention. Moving from a start block, process 1000 continues at block 1010 where the open delegation recall is received from a file server. At block 1015, the delegation states that are lost as a result of the delegation recall are determined. The process continues at decision block 1017 where a determination is made whether the delegation recall conflicts with any outstanding open on the client. For example, if the client has an exclusive open, the delegation recall may fail because of a sharing violation. If the delegation recall conflicts with an outstanding open, the client may make the open virtual. The process may also continue at block 1018 where an error is returned and the process ends.

Returning to decision block 1017, if the delegation recall does not conflict with any outstanding open, the process continues at decision block 1020 where a determination is made whether the write state of the open delegation has been lost. If the write state has not been lost, the process moves to decision block 1030.

Returning to decision block 1020, if the write state has been lost, process 1000 moves to decision block 1025 where a determination is made whether any dirty data exist. Dirty data are data associated with the object that have been cached and modified by the client and that have not been updated to the file server. If there are no dirty data, the process moves to decision block 1030.

Returning to decision block 1025, if there are dirty data, process 1000 continues at decision block 1055 where the dirty data are flushed to the server. The client may send a special open to the server for this purpose. The special open may bypass access checks. The process continues at decision block 1030.

At decision block 1030, a determination is made whether the delegation recall requires the client to flow any virtual opens to the file server. If so, process 1000 continues to block 1035 where the client flows the virtual opens to the server and the process ends. Returning to decision block 1030, if the client does not need to flow any virtual open to the file server, process 1000 ends.

It is to be appreciated that other processes may be used to handle various types of delegation recall. Two exemplary processes for handling data delegation recall will be discussed in conjunction with FIGS. 11 and 12. A combination of processes may be used to handle a message from a file server that includes multiple types of delegation recalls. After handling a delegation recall, the client may send an acknowledgement message to the file server.

Figure 11:
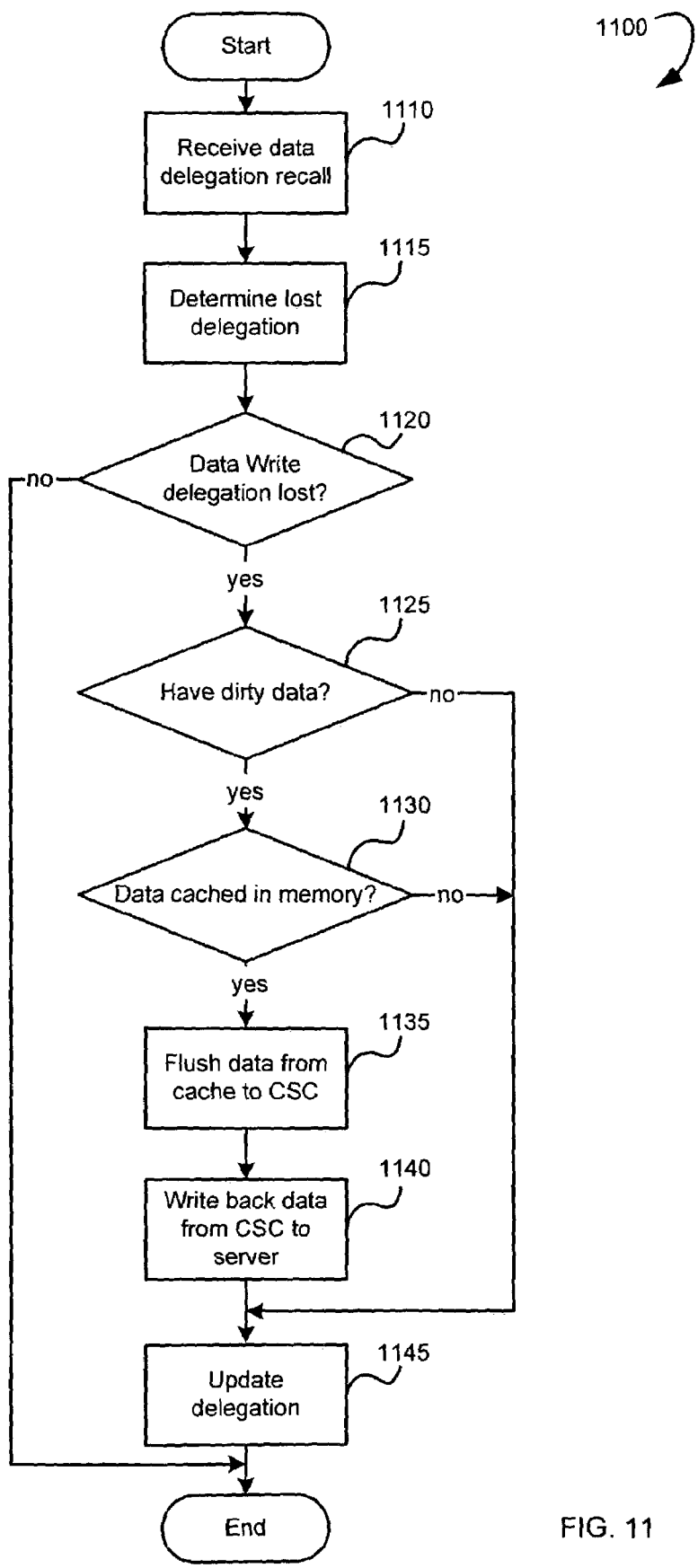
FIG. 11 is an operational flow diagram of an exemplary process for a client to handle a data write delegation recall.

FIG. 11 is an operational flow diagram of an exemplary process 1100 for a client to handle a data write delegation recall, in accordance with one embodiment of the invention. A process similar to process 1100 may be applied to an attribute write delegation recall. Moving from a start block, process 1100 continues at block 1110 where the data delegation recall is received from a file server. At block 1115, the delegation states that are lost as a result of the delegation recall are determined. The process continues at decision block 1120 where a determination is made whether the write state of the data delegation has been lost. If the write state has not been lost, the process ends.

Retuning to decision block 1120, if the write state has been lost, the process moves to decision block 1125 where a determination is made whether the client has dirty data associated with the delegation. If the client does not have dirty data, the process moves to block 1145.

Returning to decision block 1125, if the client has dirty data, process 1100 moves to decision block 1130 where a determination is made whether data associated with the delegation are cached in client's common memory. If data is not cached in common memory, the process moves to block 1145.

Returning to decision block 1130, if the data are cached in common memory, process 1100 continues at block 1135 where the data are flushed from common memory to client-side cache (CSC). CSC is a portion of the client memory specifically used for caching shared objects on the file server. At block 1140, the data are written back from the CSC to the file server. At block 1145, the client's delegation records are updated with the new data delegation and the process ends.

Figure 12:
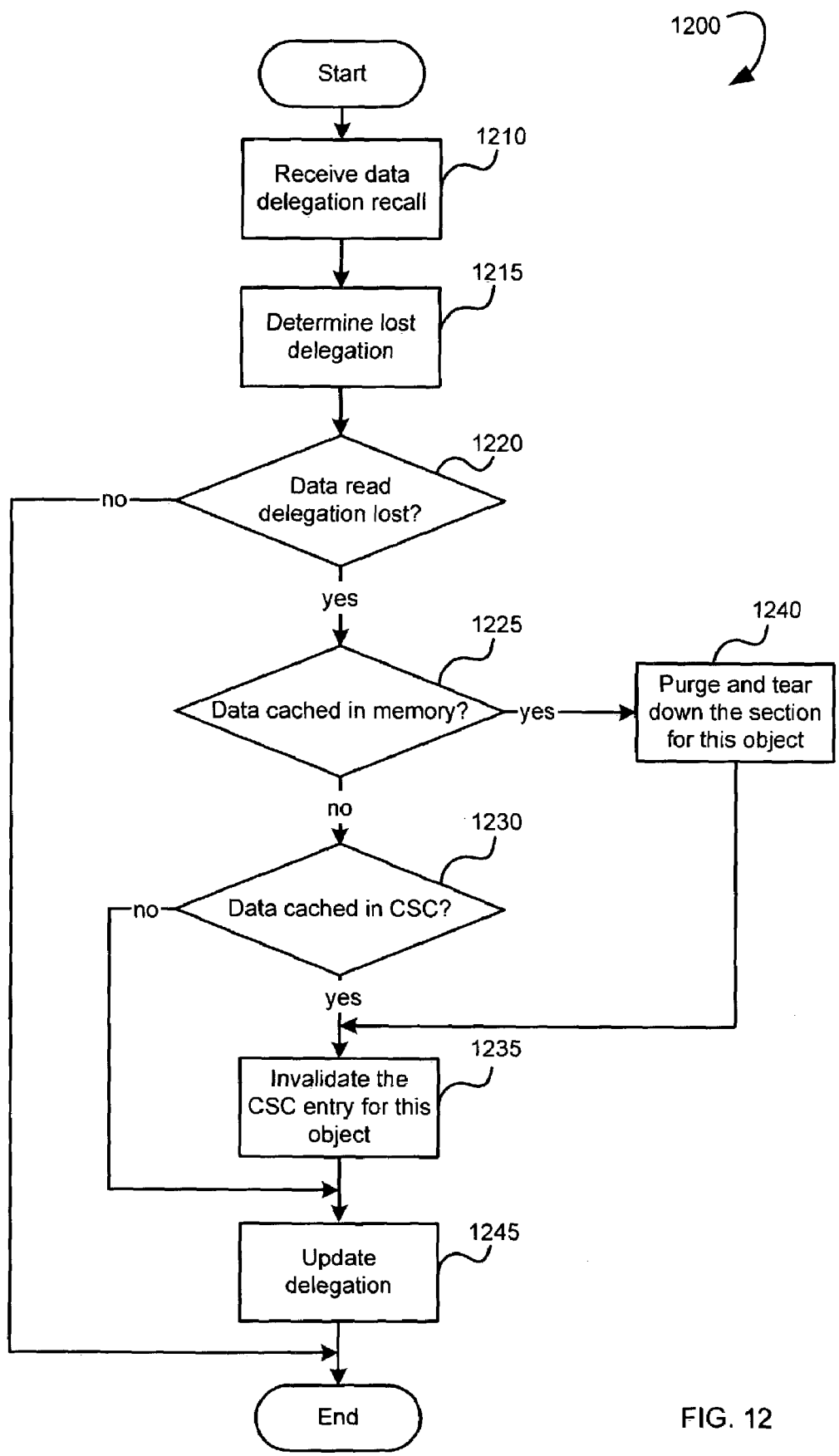
FIG. 12 is an operational flow diagram of an exemplary process for a client to handle a data read delegation recall.

FIG. 12 is an operational flow diagram of an exemplary process 1200 for a client to handle a data read delegation recall, in accordance with one embodiment of the invention. A process similar to process 1200 may be applied to an attribute read delegation recall. Moving from a start block, process 1200 continues at block 1210 where the data delegation recall is received from a file server. At block 1215, the delegation states that are lost as a result of the delegation recall are determined. The process continues at decision block 1220 where a determination is made whether the read state of the data delegation has been lost. If the read state has not been lost, the process ends.

Retuning to decision block 1220, if the read state has been lost, the process moves to decision block 1225 where a determination is made whether the client has data associated with the delegation and are cached in common memory. If the data are cached in common memory, the process moves to block 1240 where the section of common memory with the data are purged and torn down. Process 1200 continues at block 1235.

Returning to decision block 1225, if the data are not cached in common memory, process 1100 moves to decision block 1130 where a determination is made whether the data are cached in client-side cache (CSC). If data is not cached in common memory, the process moves to block 1245.

Returning to decision block 1230, if the data are cached in CSC, process 1100 continues at block 1235 where the CSC entry for the data is invalidated. Process 1200 continues at block 1245 where the client's delegation records are updated with the new data delegation and the process ends.

Figure 13:
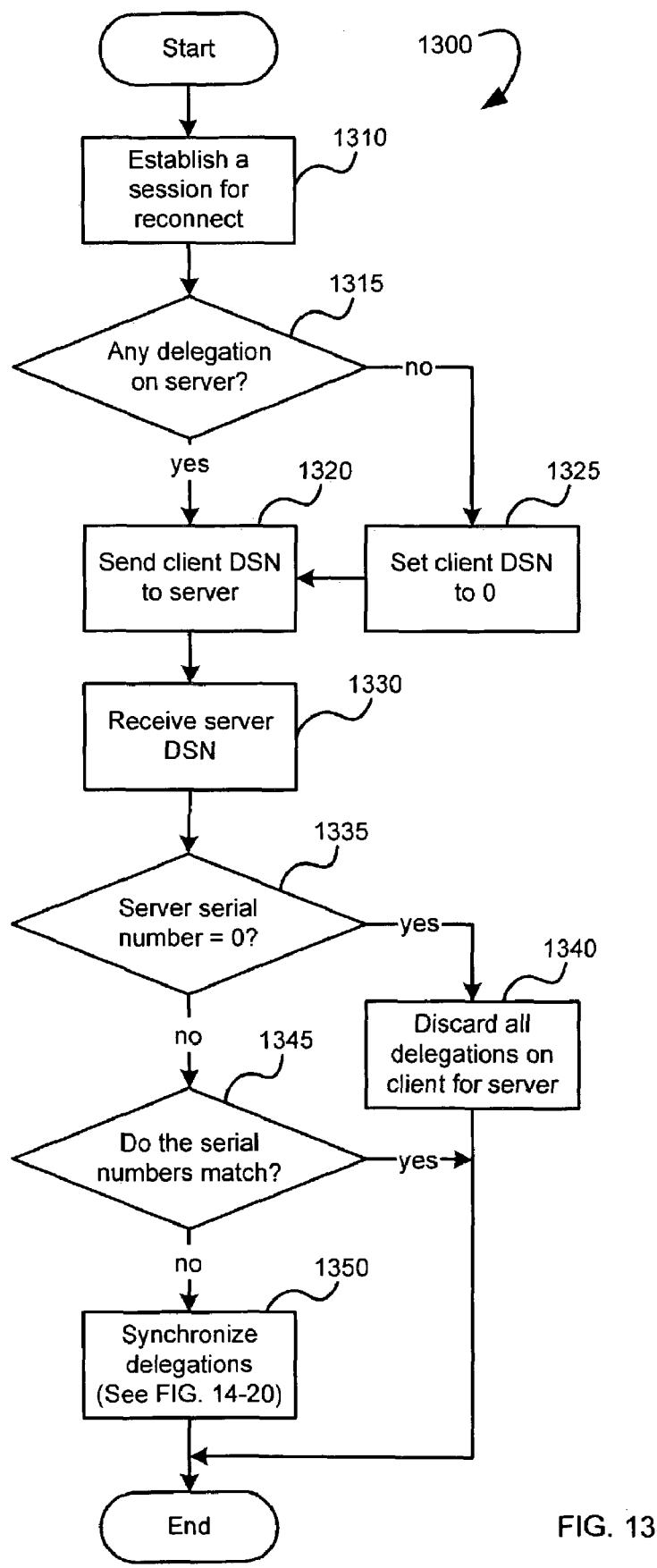
FIG. 13 is an operational flow diagram of an exemplary process for a client to reconnect to a file server.

FIG. 13 is an operational flow diagram of an exemplary process 1300 for a client to reconnect to a file server, in accordance with one embodiment of the invention. Moving from a start block, process 1300 begins at block 1310 where a session on the file server is established. The session established by process 1300 is used primary for reconnecting with the file server after an event, such as a predetermined period of time has elapsed, a client or server system crash, communication failure, etc.

At decision block 1315, a determination is made whether the client has any delegation on the file server. If the client has delegation on the file server, process 1310 moves to block 1320. If the client has no delegation on the file server, process 1310 moves to block 1325 where the client delegation serial number (DSN) is set to 0. The process also moves to block 1320.

At block 1320, the client sends the client DSN to the file server. In this embodiment, the file server is configured to response to the DSN sent by the client with a server DSN stored in the file server's delegation records. At block 1330, the DSN stored on the file server is received. Process 1310 continues at decision block 1335 where a determination is made whether the server DSN is 0. If so, process 1310 moves to block 1340 where the delegations of the client for the file server are discarded and the process ends.

Returning to decision block 1335, if the server DSN is not 0, process 1310 continues at decision block 1345 where a determination is made whether the server DSN matches the client DSN. If so, the process ends. If the DSN's do no match, process 1300 continues at block 1350 where the delegations on the client and those on the file server are synchronized. An exemplary process for synchronizing delegations will be discussed in more details in conjunction with FIG. 14. After performing the delegation synchronization process, process 1300 ends.

It is to be appreciated that process 1300 is just one of the many embodiments that may be use for a client to reconnect to a file server. Many more reconnection processes are possible. Exemplary communications between a client and a file server for process 1300 will be discussed in conjunction with FIG. 16. Communications for additional exemplary reconnect embodiments will be discussed in conjunction with FIGS. 17-20.

Figure 14:
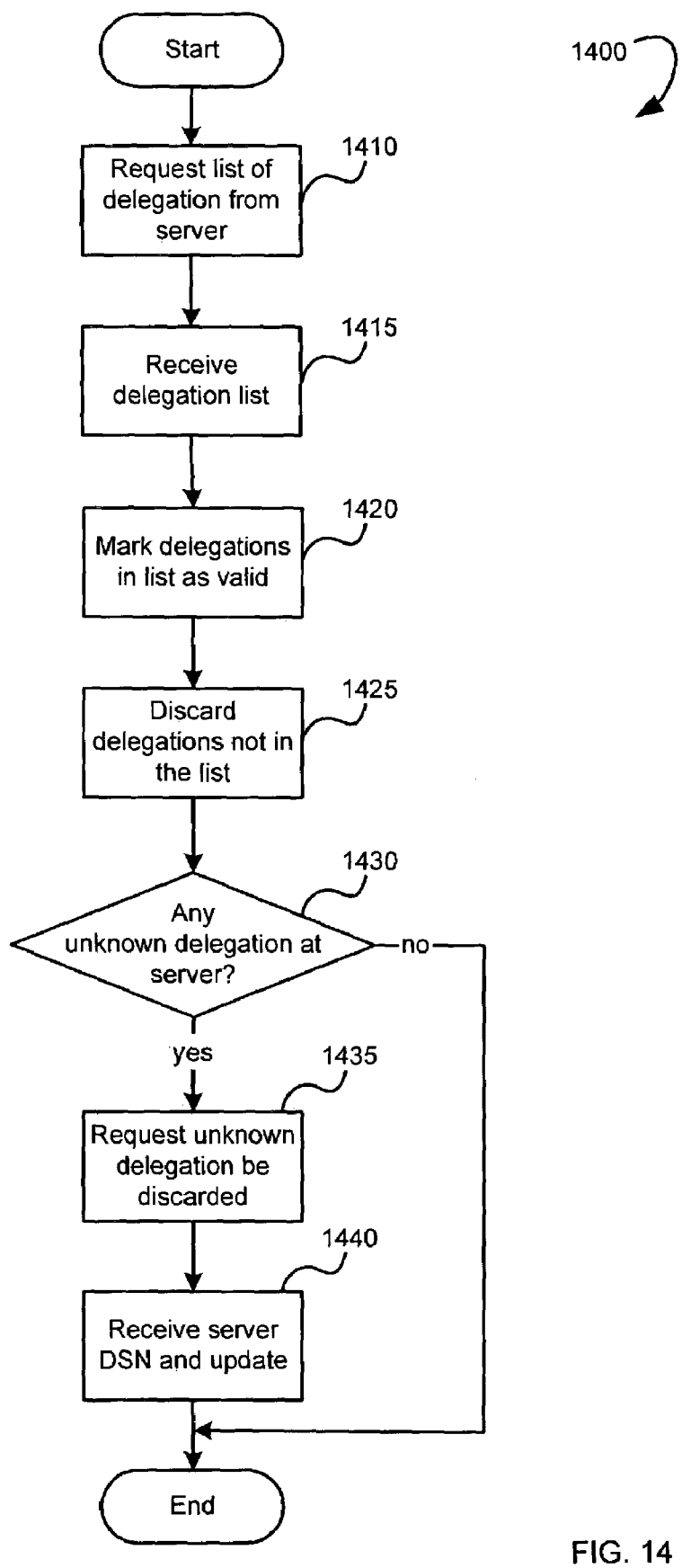
FIG. 14 is an operational flow diagram of an exemplary process for a client to synchronize its delegations with the delegations on a file server.

FIG. 14 is an operational flow diagram of an exemplary process 1400 for a client to synchronize its delegations with the delegations on a file server, in accordance with one embodiment of the invention. Moving from a start block, process 1400 begins at block 1410 where a list of delegations associated with the client is requested from the file server. At block 1415, the list of delegations on the file server is received. The client may use the list to check its delegations on object managed by the file server. At block 1420, the client marks the delegations that are identified in the list as valid. At 1425, the client discards the delegations that are not identified in the list. At decision block 1430, a determination is made whether there are delegations on the list that are unknown to the client. Unknown delegations may be generated as a result of a failure scenario, such as if the client's system failed before the delegations were recorded by the client, if a failure causes the delegation records to be lost, etc. If there are no unknown delegations, process 1400 ends.

Returning to decision block 1430, if there are unknown delegation on the file server, process 1400 continues at block 1435 where the client requests the file server to discard the unknown delegation. At block 1440, a new DSN is received and the client updates its delegation records with the new number. The process then ends.

Figure 15:
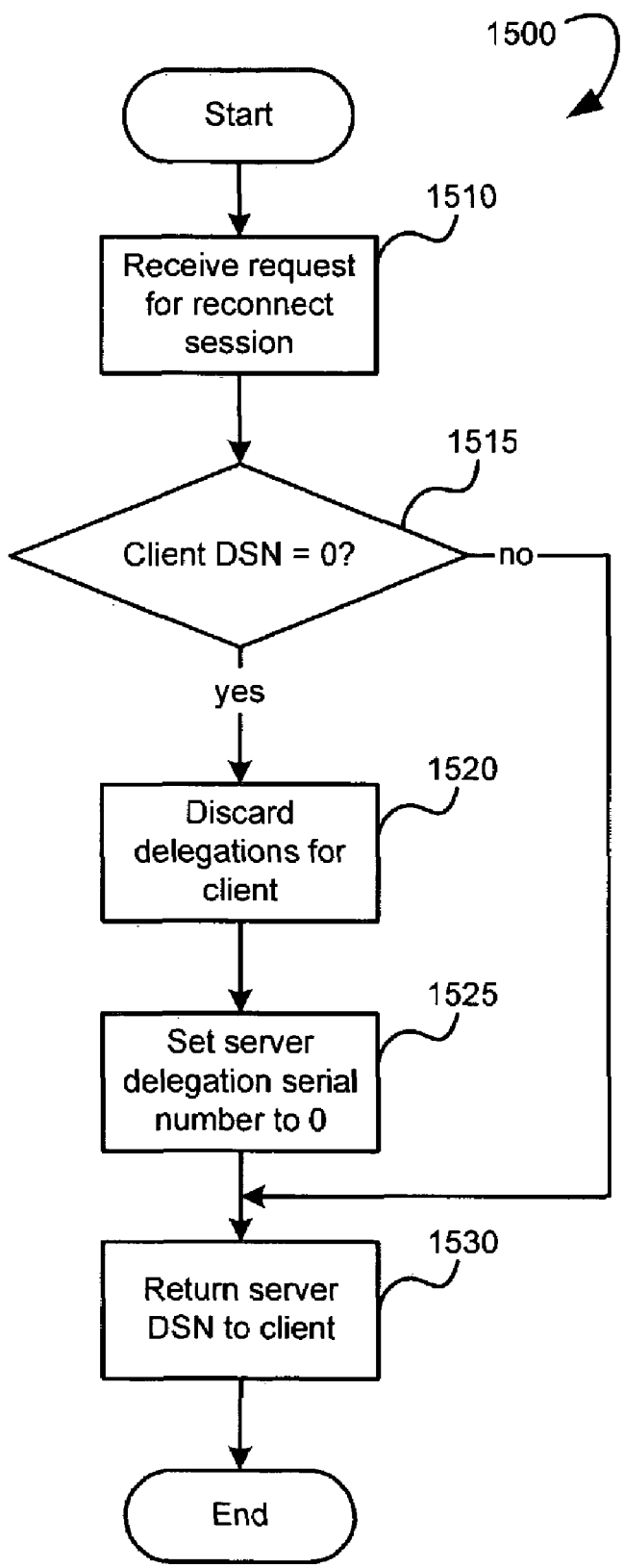
FIG. 15 is an operational flow diagram of an exemplary process for a file server to reconnect with a client.

FIG. 15 is an operational flow diagram of an exemplary process 1500 for a file server to reconnect with a client, in accordance with one embodiment of the invention. Moving from a start block, process 1500 begins at block 1510 where a request for a reconnect session is received from the client. At decision block 1515, a determination is made whether the client delegation serial number (DSN) is 0. If so, process 1500 continues at block 1520 where the delegations for the client are discarded. At block 1525, the server DSN is set to 0. The process continues at block 1530.

Returning to decision block 1515, if the client DSN is not 0, process 1500 continues at block 1530. At block 1530, the server DSN is returned to the client and the process ends.

Figure 16:
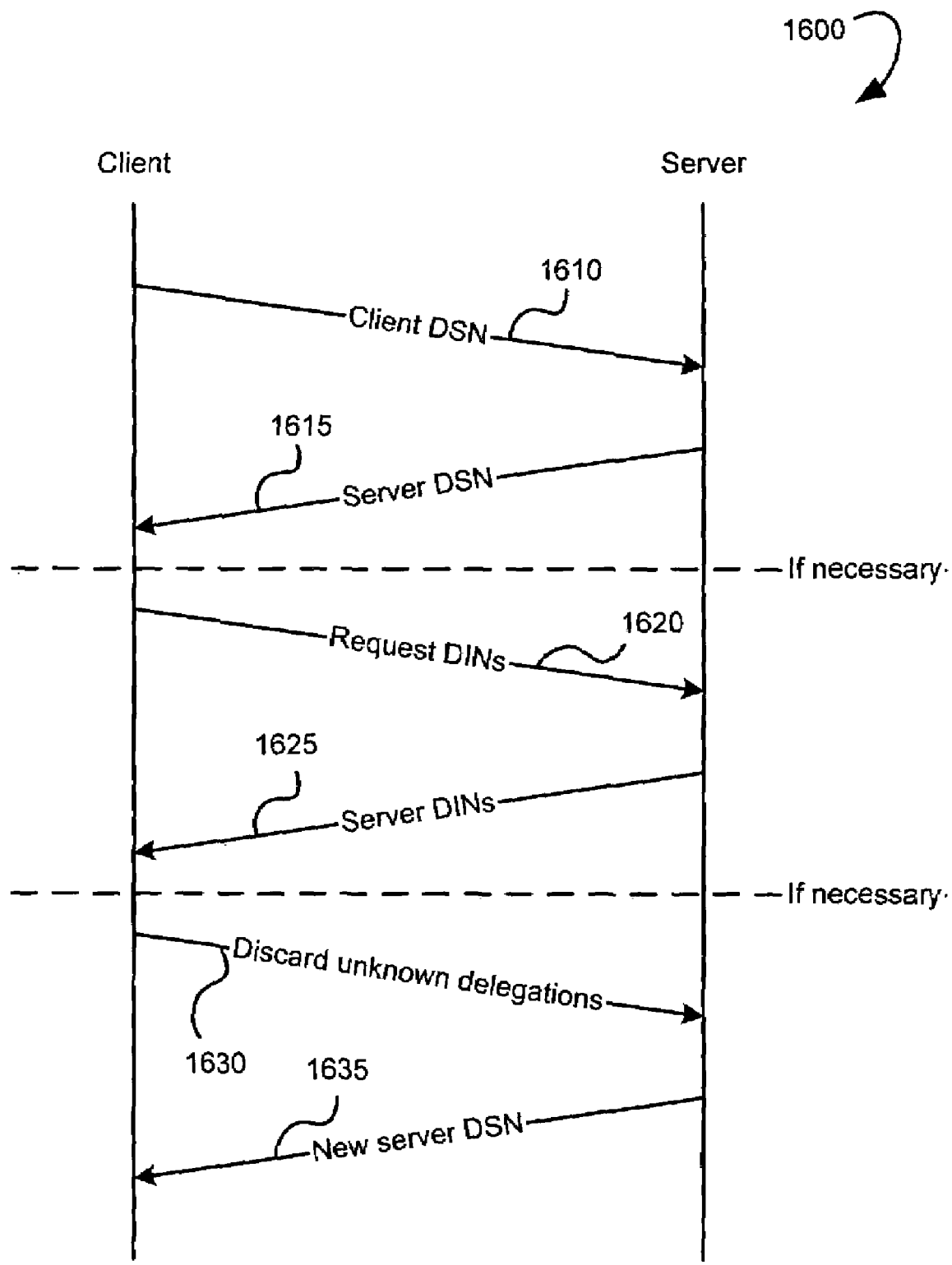
FIG. 16 is a schematic diagram of exemplary communications that may be used for a client to reconnect with a file server.

FIG. 16 is a schematic diagram of exemplary communications that may be used for a client to reconnect with a file server, in accordance with one embodiment of the invention. Communications 1600 in this figure are associated with process 1300 shown in FIG. 13. Communications 1600 begins by the client sending message 1610 with a client delegation serial number (DSN) to the file server. In response to receiving the client DSN, the file server sends a message 1615 with a server DSN to the client.

If the client DSN and the server DSN do not match, client sends message 1620 with a request for delegation identification numbers (DINs) for the delegations that belong to the client. In response to receiving the request for DINs, the server sends message 1625 with the DINs to the client.

If the server DINs include some delegations that are unknown to the client, the client sends message 1630 that includes a request for discarding the unknown delegation identified by DINs. The file server responds by sending message 1635 that includes the new server DSN to the client.

Figure 17:
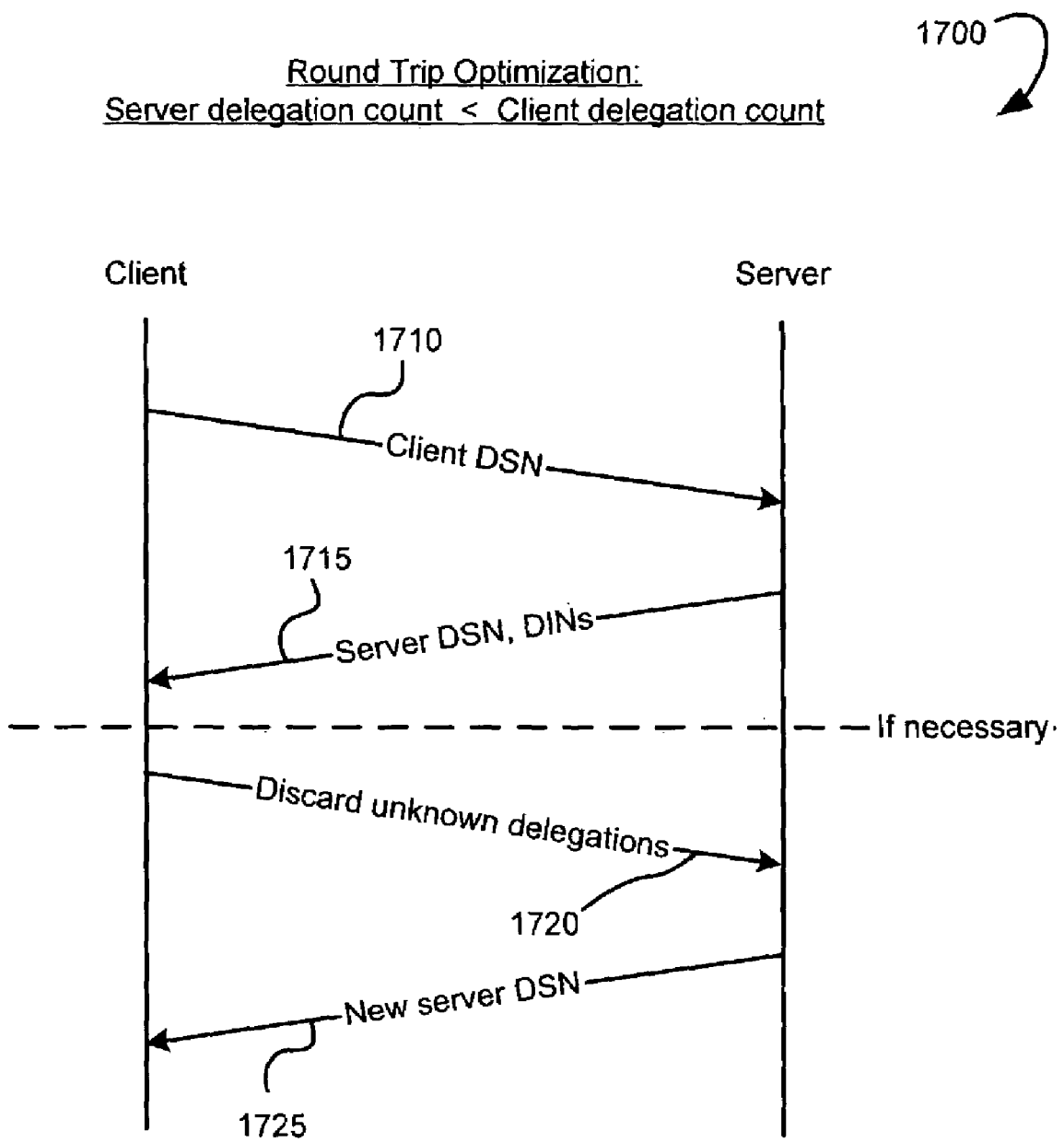
FIG. 17 is a schematic diagram of exemplary communications that may be used for reconnection process that may streamline communication roundtrips.

FIG. 17 is a schematic diagram of exemplary communications that may be used for reconnection process that may streamline communication roundtrips, in accordance with one embodiment of the invention. In this embodiment, the count of delegations on the server is less than the count of delegations on the client. Communications 1700 begins by the client sending message 1710 with a client delegation serial number (DSN) to the file server. In response to receiving the client DSN, the file server sends a message 1715 with a server DSN to the client and the DINs for the delegations that belong to the client.

If the client includes some delegations that are unknown to the server, the client sends a message 1720 that includes a notice for discarding the unknown delegation identified by DINs. The file server responds by sending a message 1725 that includes a new server DSN to the client.

Figure 18:
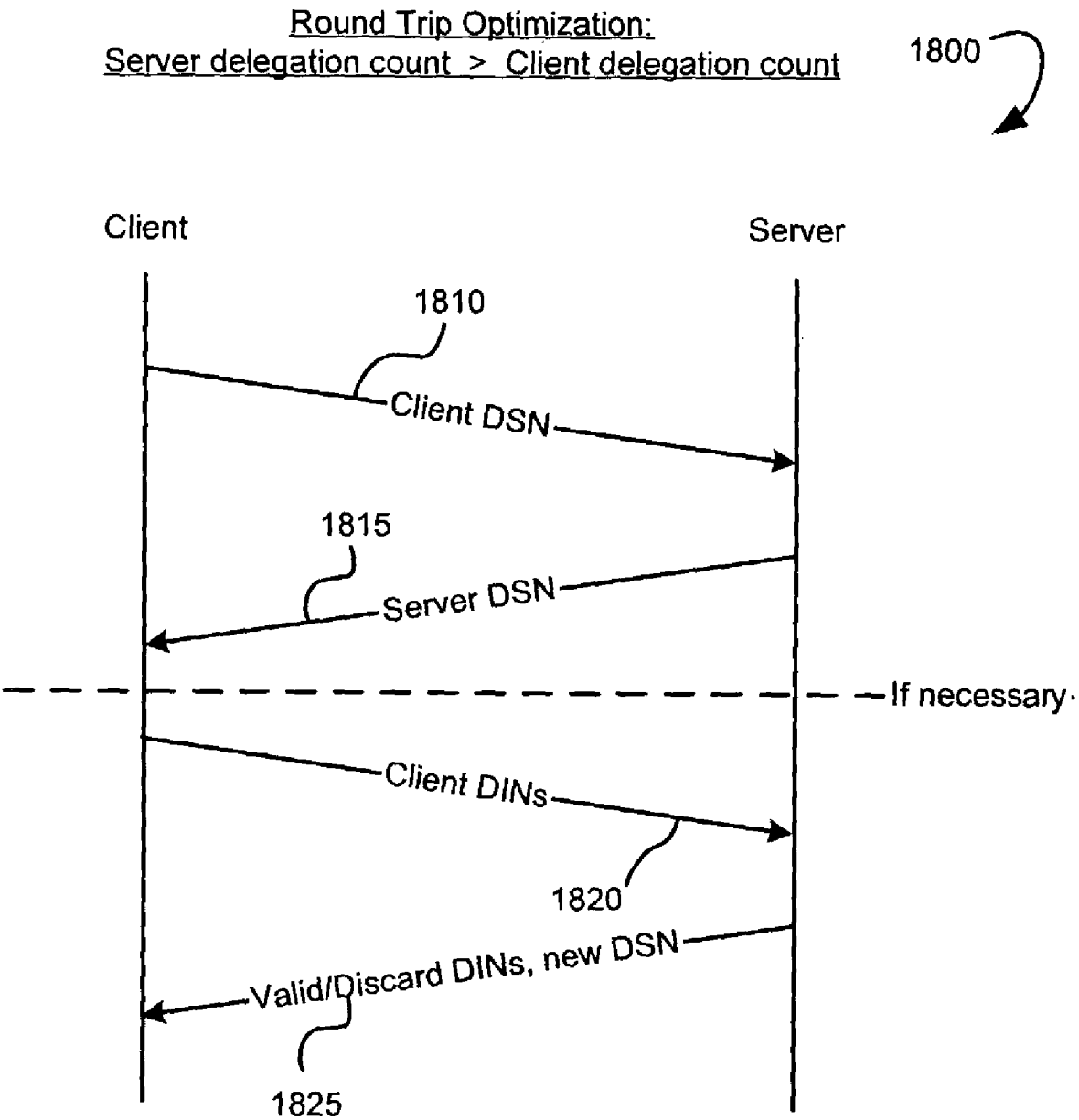
FIG. 18 is a schematic diagram of exemplary communications that may be used for another reconnection process that may streamline communication roundtrips.

FIG. 18 is a schematic diagram of exemplary communications that may be used for another reconnection process that may streamline communication roundtrips, in accordance with one embodiment of the invention. In this embodiment, the count of delegations on the server is more than the count of delegation on the client. The communications begins by the client sending message 1810 with a client DSN to the file server. In response to receiving the client DSN, the file server sends a message 1815 with a server DSN to the client to the client.

If the DSNs do not match and neither of the DSNs is zero, the client sends a list of the DINs it knows about for that server in message 1820. After updating its state to only include the DINs that are in both the server state and the client list of DINs, the server responds in message 1825 with a new DSN and the shorter of: 1) the list of DINs that the client needs to discard because they are not present in the server state, or 2) the list of DINs that the client should keep because they are in the server state.

Figure 19:
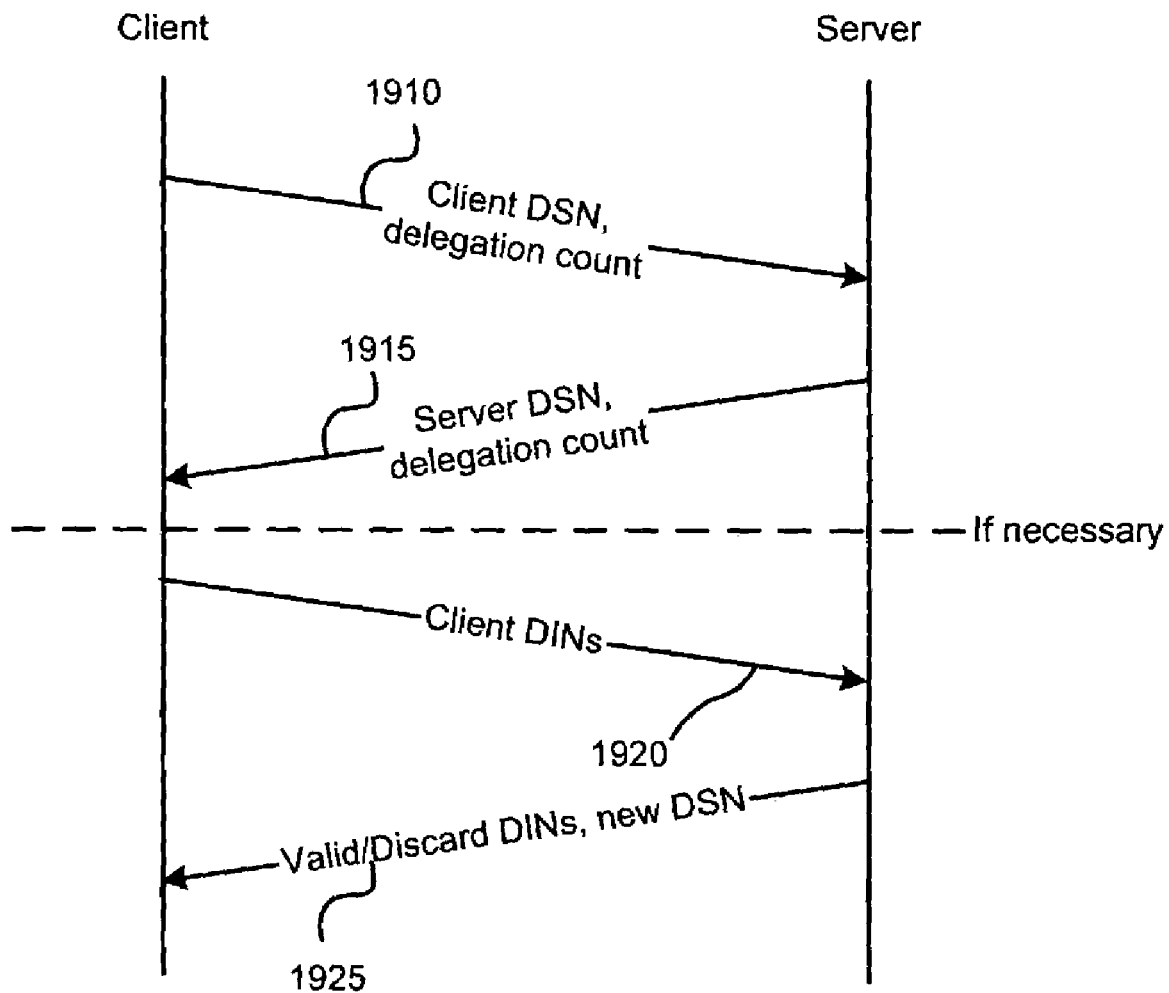
FIG. 19 is a schematic diagram of exemplary communications that may be used for a reconnection process that may streamline the communications based on delegation count.

FIG. 19 is a schematic diagram of exemplary communications that may be used for a reconnection process that may streamline the communications based on delegation count, in accordance with one embodiment of the invention. In this embodiment, the count of delegations on the server is more than the count of delegation on the client. Communications 1900 begins by the client sending message 1910 with a client DSN and a count of the client delegations to the file server. In response to receiving message 1910, the file server sends a message 1915 with a server DSN and a count of the server delegations to the client.

If the DSNs do not match and neither of the DSNs is zero, the client sends a list of the DINs it knows about for that server in message 1920. After updating its state to only include the DINs that are in both the server state and the client list of DINs, the server responds in message 1925 with a new DSN and the shorter of: 1) the list of DINs that the client needs to discard because they are not present in the server state, or 2) the list of DINs that the client should keep because they are in the server state.

Figure 20:
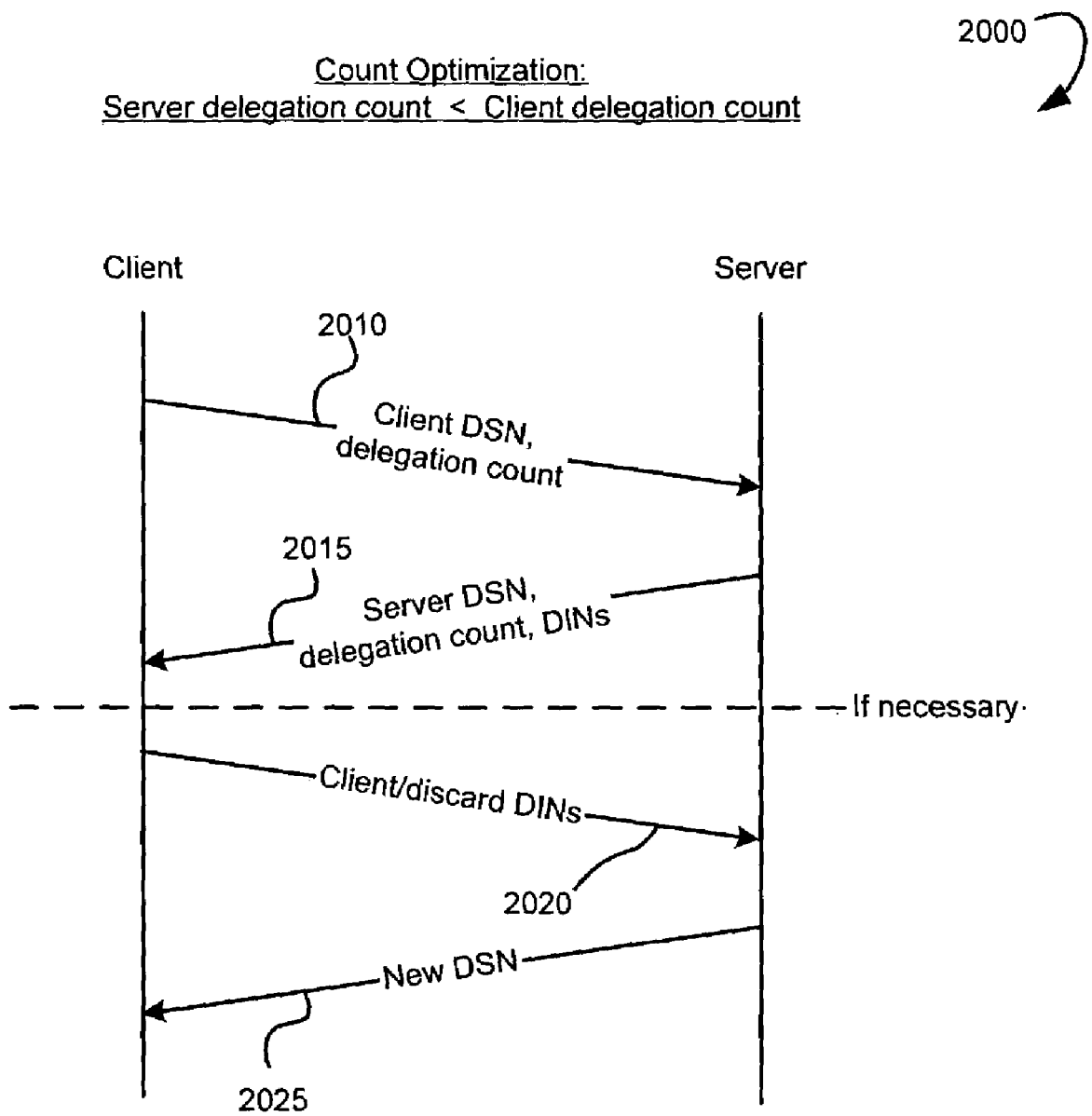
FIG. 20 is a schematic diagram of exemplary communications that may be used for another reconnection process that may streamline the communications based on delegation count; in accordance with embodiments of the invention.

FIG. 20 is a schematic diagram of exemplary communications that may be used for another reconnection process that may streamline the communications based on delegation count, in accordance with one embodiment of the invention. In this embodiment, the count of delegations on the server is less than the count of delegation on the client. The communications begins by the client sending message 2010 with a client delegation serial number (DSN) to the file server. In response to receiving the client DSN, the file server sends a message 2020 with a server DSN, the server DINs for the delegations that belong to the client, and a count of the server delegations.

After updating its state to include only the DINs that are both in the client state and the server list of DINs, the client responds in message 2020 with the shorter of: 1) the list of DINs that remain in the client state, or 2) the list of DINs that the server needs to discard to match the client state. The file server responds by sending a message 2025 that includes a new server DSN to the client.

In conclusion, the present invention provides a system and method for delegation file system operations. It provides an object-sharing environment that streamlines the file system operations when an object is only shared by one client without sacrificing the capabilities of sharing the object with multiple clients. The present invention also provides a mechanism to that enable the object-sharing environment to survive failures. Because delegations typically require less client/server communications than convention system, the present invention also enables clients with a slow communication link to participate in an object sharing environment.

The above specification, examples and data provide a complete description of the invention. Since many embodiments of the invention can be made without departing from the spirit and scope of the invention, the invention resides in the claims hereinafter appended.

What is claimed is:

1. A computer-implemented method for a client to interact with a server comprising:
   obtaining a first delegation that enables the client to perform a file system operation on an object without keeping a file handle associated with the object on the server; wherein the object is sharable by other clients during the first delegation such that the other clients can access the object simultaneously; and wherein the first delegation is revocable by the server at any time;
   sending a second delegation request for a second delegation; wherein the second delegation request includes a request for one or more rights that are associated with the object;
   determining when the second delegation associated with the object managed by the server is obtained, the second delegation enabling the client to perform another file system operation without keeping the file handle associated with the object on the server; wherein the obtained second delegation may include a different number of rights as compared to a number of rights that was requested by the second delegation request and wherein the server demands release of the first delegation or demands the client holding the first delegation to modify the rights associated with the first delegation;
   wherein the client holding the first delegation is required to release or modify the first delegation in response to the demand from the server; and wherein the second delegation is obtained even when a delegation has already been associated with the object managed by the server;
   determining when the second delegation is not obtained; and when the second delegation is not obtained opening the object using the first delegation when rights associated with the first delegation are sufficient; otherwise opening the object using a conventional process not involving delegations when the second delegation is not obtained;
   caching the object;
   enabling users associated with the client to access the object in accordance with the delegation;
   receiving a recall command from the server due to a request by another client to access the object, the recall command including a new delegation having a state with a lower access level;
   determining whether there is an existing process on the client that would cause the request from the other client to be denied; and
   if so, denying the recall command; wherein denying the recall command temporarily extends the delegation.

2. The computer-implemented method of claim 1, wherein the second delegation enables the client to perform a file system operation associated with opening the object.

3. The computer-implemented method of claim 2, further comprises:
   receiving from a user the delegation request to open the object; and
   in response to the request, performing a file system operation associated with opening the object using the second delegation.

4. The computer-implemented method of claim 1, wherein the second delegation enables the client to perform a file system operation associated with accessing data associated with the object.

5. The computer-implemented method of claim 4, further comprises:
   receiving a request from a user to access the data associated with the object; and
   in response to the request, performing a file system operation associated with giving the user access to the data using the second delegation.

6. The computer-implemented method of claim 1, wherein the second delegation enables the client to perform a file system operation associated with accessing an attribute associated with the object.

7. The computer-implemented method of claim 6, further comprises:
   receiving a request from a user to access attributes associated with the object; and
   in response to the request, performing a file system operation associated with giving the user access to the attribute using the second delegation.

8. A computer-implemented method for a client to handle a request associated with an object that is managed by a server, the computer-implemented method comprising:
   processing the request using a delegation associated with the object when the delegation is obtained, the delegation enabling the client to perform a file system operation on the object on behalf of the server; wherein the delegation must be released by the client when requested by the server; wherein more than one delegation may be associated with the object; wherein the object is sharable by other clients during the first delegation such that the other clients can access the object simultaneously; and wherein the first delegation is revocable by the server at any time;
   performing a file system operation associated with the request in accordance with the delegation when obtained;
   when the delegation is not obtained; performing the file system operation associated with the request in accordance with a previously obtained delegation when rights associated with the previously obtained delegation are sufficient; otherwise performing the file system operation associated with the request using a conventional process not involving delegations when the delegation is not obtained;
   receiving a recall command from the server due to a request by another client to access the object, the recall command including a new delegation having a state with a lower access level;
   determining whether there is an existing process on the client that would cause the request from the other client to be denied; and
   if so, denying the recall command; wherein denying the recall command temporarily extends the delegation.

9. The computer-implemented method of claim 8, further comprises:
   acquiring the delegation from the server; and
   recording the delegation for performing further file system operations on the object.

10. The computer-implemented method of claim 8, further comprises:

upgrading the delegation by communicating with the server; and modifying delegation records to include the upgraded delegation.

11. The computer-implemented method of claim 10, wherein upgrading the delegation includes obtaining a delegation state to perform the file system operation.

12. The computer-implemented method of claim 8, further comprising:

performing file system operations in response to the recall command; and acknowledging the command.

13. The computer-implemented method of claim 12, wherein the recall command includes a downgraded delegation.

14. The computer-implemented method of claim 13, wherein performing file system operations in response to the recall command includes postponing the recall command.

15. The computer-implemented method of claim 13, wherein performing file system operations in response to the recall command includes flowing file system states to the server.

16. The computer-implemented method of claim 13, wherein performing file system operations in response to the recall command includes updating data associated with the object on the server.

17. The computer-implemented method of claim 16, wherein updating the data includes writing modified data associated with the object to the server.

18. The computer-implemented method of claim 16, wherein updating the data includes flushing modified data associated with the object to a client-side cache.

19. A computer-implemented method for a client to handle an object that is managed by a server, the computer-implemented method comprising:

receiving a request to access the object;

sending a delegation request; wherein the delegation request includes a first set of requested rights that are associated with the object;

determining when a delegation associated with the object is acquired, the delegation enabling the client to perform a file system operation on the object on behalf of the server; wherein the acquired delegation includes a second set of rights that are associated with the object; wherein the second set of rights includes a different number of rights as compared to the first set of requested rights; wherein the second set of rights acquired is a different number of rights as requested by the delegation request;

wherein the delegation is acquired even when a delegation has already been associated with the object; performing the file system operation on the object without additional communications with the server;

determining when the delegation is not acquired; and when the delegation is not acquired performing the file system operation on the object using a previously obtained delegation when rights associated with the previously obtained delegation are sufficient;

otherwise performing the file system operation on the object using a conventional process not involving delegations when the delegation is not obtained;

receiving a recall command from the server due to a request by another client to access the object, the recall command including a new delegation having a state with a lower access level;

determining whether there is an existing process on the client that would cause the request from the other client to be denied; and if so, denying the recall command; wherein denying the recall command temporarily extends the delegation.

20. The computer-implemented method of claim 19, further comprising:

maintaining information about the delegation;

receiving another request to access the object;

in response to the other request, performing another file system operation on the object using the information without additional communications with the server.

21. The computer-implemented method of claim 19, further comprising:

receiving another request to access the object;

upgrading the delegation by communicating with the file server;

obtaining from the server an upgraded delegation having a state with sufficient level to process the other request; and performing another file system operation based on the upgraded delegation, in response to the other request.

22. The computer-implemented method of claim 19, further comprising:

receiving a recall command from the file server, the recall command including a new delegation having a state with a lower access level;

flowing a file system state that is not covered by the new delegation; and sending an acknowledgement to the file server.

23. The computer-implemented method of claim 19, wherein determining whether there is an existing process that would cause the request from the other client to be denied includes determining whether there is an exclusive open associated with the object.

24. The computer-implemented method of claim 22, further comprising writing modified data associated with the shared object to the file server in response to the new delegation.

25. A computer-implemented method for a server to share an object managed by the server with clients, the computer-implemented method comprising:

receiving a first request for accessing the object from a first client; wherein the first request includes a request for rights associated with the object;

determining whether a first delegation may include the requested rights;

determining when to issue the first delegation; and when the first delegation is to be issued: issuing the first delegation to the first client with the requested rights when determined that the first delegation may include the requested rights, otherwise issuing the first delegation to the first client with a different set of rights from the rights requested, the first delegation enabling the client to perform file system operations on the object; wherein the first delegation is issued even when a delegation has already been associated with the object; wherein the first delegation must be revoked by the first client when requested; and when the first delegation is not to be issued: allowing the client to perform the file system operations on the object using a conventional process when the first delegation is not obtained;

receiving a recall command from the server due to a request by another client to access the object, the recall command including a new delegation having a state with a lower access level;

determining whether there is an existing process on the first client that would cause the request from the other client to be denied; and if so, denying the recall command; wherein denying the recall command temporarily extends the delegation.

26. The computer-implemented method of claim 25, wherein the different rights may include more rights then requested or less rights then requested.

27. The computer-implemented method of claim 26, wherein the rights of the first delegation enable the first client to perform file system operations on the object without further communication with the server.

28. The computer-implemented method of claim 25, further comprising:

receiving a second request for accessing the object from a second client; and if the second request does not conflict with the first delegation, enabling the second client to access the object.

29. The computer-implemented method of claim 28, wherein enabling the second client to access the object includes issuing a second delegation to the second client and wherein the second delegation conflicts with the first delegation.

30. The computer-implemented method of claim 29, wherein if the second request conflicts with the first delegation, recalling the first delegation from the first client; wherein recalling the first delegation causes the release of the first delegation.

31. The computer-implemented method of claim 30, wherein the second request conflicts with the first delegation if the states of the first delegation prevents the server from satisfying the second request.

32. The computer-implemented method of claim 31, wherein recalling the first delegation includes replacing the first delegation with another delegation that does not prevent the server from satisfying the second request.

33. The computer-implemented method of claim 32, wherein recalling the first delegation includes flowing a file system operation that conflicts with the other delegation from the first client to the server.

34. The computer-implemented method of claim 33, wherein recalling the first delegation includes writing back modified data associated with the object from the client to the server.

35. The computer-implemented method of claim 34, wherein recalling the first delegation includes writing back attributes associated with the object from the client to the server.

36. A method for communicating between clients and servers in a distributed file system, comprising:

issuing, by a first client to a server, a first request for a first delegation associated with an object managed by the server, the first delegation enabling the first client to perform a file system operation on the object; wherein the first request includes desired states that are associated with the object;

receiving, by the server from the first client, the first request for the first delegation and determining states associated with the delegation;

determining when to issue the first delegation; and when determined to issue the first delegation: issuing, by the server to the first client, the first delegation having the determined states; wherein the determined states included within the first delegation may be different from the desired states requested by the first request; wherein the delegation is issued by the server even when a delegation for the object has already been issued to a second client;

receiving, by the first client from the server, the first delegation and performing a file system operation on the object in accordance with the first delegation; wherein the first delegation must be released by the first client when requested by the server;

when the first delegation is not issued: allowing the client to perform the file system operation on the object using a conventional process when the first delegation is not issued;

receiving a recall command from the server due to a request by another client to access the object, the recall command including a new delegation having a state with a lower access level;

determining whether there is an existing process on the first client that would cause the request from the other client to be denied; and if so, denying the recall command; wherein denying the recall command temporarily extends the delegation.

37. The method of claim 36, further comprising:

receiving, by the server from a second client, a second request for accessing the object, the request conflicting with the first delegation; and issuing, by the server to a second client, permission to access the object.

38. The method of claim 37, wherein the request from the second client for accessing the object includes a request for a second delegation and wherein the permission to access the object issued by the server includes the second delegation for the second client.

39. The method of claim 36, further comprising:

receiving, by the server from a second client, a second request for accessing the object, the second request conflicting with the first delegation; and issuing, by the server to a first client, a recall command for recalling the first delegation.

40. The method of claim 39, wherein the recall command includes a modified first delegation that is compatible with the second request.

41. The method of claim 39, further comprising:

receiving, by the first client from the server, the recall command and configuring operations associated with the object in accordance with the recall command; and issuing, by the first client to the server, an acknowledgement.

42. The method of claim 39, further comprising flowing, by the first client to the server, file system operations that conflict with the recall command.

43. The method of claim 39, further comprising:

receiving, by the server from the first client, the acknowledgement command; and issuing, by the server to the second client, permission to access the object.

44. A distributed file system for sharing an object, comprising:

a first client configured to obtain a delegation associated with the object, the delegation enabling the first client to perform a file system operation; wherein the delegation must be released by the first client regardless of a desire of the first client to keep the delegation; wherein the delegation is obtained even when a delegation has already been associated with the object; wherein the client may perform the file system operation without receiving the delegation using a conventional process when the delegation is not obtained; and a file server configured to manage the object and to issue the delegation associated with the object; the file server further configured to issue a recall command due to a request by another client to access the object, the recall command including a new delegation having a state with a lower access level;

determining whether there is an existing process on the first client that would cause the request from the other client to be denied; and if so, denying the recall command;

wherein denying the recall command temporarily extends the delegation.

45. The system of claim 44, wherein the first client is configured to perform the file system operation in accordance with the delegation without communicating with the server.

46. The system of claim 44, wherein the first client is configured to cache the object and to enable a user to access the cached object.

47. The system of claim 44, wherein the file server is configured to enable a second client to access the object while the delegation is issued to the first client.

48. The system of claim 47, wherein to enable a second client to access the object, the file server is configured to recall the delegation from the first client.

49. The system of claim 48, wherein to recall the delegation includes to issue a modified delegation to the first client.

50. The system of claim 49, wherein the first client is configured to flow a file system operation that conflicts with the modified delegation to the file server.

51. A computer-implemented method for handling an object that is managed by a server, the computer-implemented method comprising:

determining when to provide a delegation associated with the object; and when determined to provide the delegation: providing, by the server to a first client, the delegation associated with the object, the delegation enabling the first client to perform a file system operation on the object without keeping on the server a file handle associated with the object, the delegation including states, each state granting to the client a right to perform a file system operation; wherein the states included within the delegation provided to the first client may be different from requested states included within a delegation request that is obtained from the first client; wherein the delegation is provided to the first client even when a delegation associated with the object has been provided to a second client; maintaining, by the first client, the states associated with the delegation independent of an active communication link with the server;

wherein the delegation must be released by the first client when requested by a server and when the delegation is not provided: the client performing the file system operation on the object using a conventional process not involving delegations;

receiving a recall command from the server due to a request by another client to access the object, the recall command including a new delegation having a state with a lower access level;

determining whether there is an existing process on the first client that would cause the request from the other client to be denied; and if so, denying the recall command; wherein denying the recall command temporarily extends the delegation.

52. The computer-implemented method of claim 51, further comprising:

receiving a request from a second client to access the object, the request requiring a right granted by a state in the delegation;

recalling the delegation to reacquire the required state from the first client; and granting the request from the second client to access the object.

53. The computer-implemented method of claim 51, further comprising locally maintaining, by the first client, open states associated the object independent of the states associated with the delegation.

* * * * *